United States Patent [19]
Walker et al.

[11] 3,879,919
[45] Apr. 29, 1975

[54] ARTICLE HANDLING APPARATUS

[75] Inventors: Edward S. Walker; George A. Douglas, both of Danville, Ky.

[73] Assignee: Corning Glass Works, Corning, N.Y.

[22] Filed: May 6, 1974

[21] Appl. No.: 467,281

[52] U.S. Cl. ............... 53/59 R; 53/236; 53/245; 53/248; 53/251
[51] Int. Cl. ............... B65b 57/20; B65b 19/34
[58] Field of Search ........... 53/59 R, 236, 245, 248, 53/251, 163

[56] References Cited
UNITED STATES PATENTS
2,767,536 10/1956 Forkel .................. 53/245 X
2,997,828 8/1961 Ahlbor .................. 52/59 R Primary Examiner—Travis S. McGehee
Attorney, Agent, or Firm—Charles W. Gregg; Clarence R. Patty, Jr.

[57] ABSTRACT

Apparatus for automatically handling and loading similar pluralities or quantities of similar longitudinal cylindrical articles such as, for example, similar size rods or tubes, into each of a plurality of containers, cartons or boxes for storage or shipment of the articles, the apparatus being especially useful in handling and loading of relatively frangible articles without breakage thereof.

16 Claims, 25 Drawing Figures

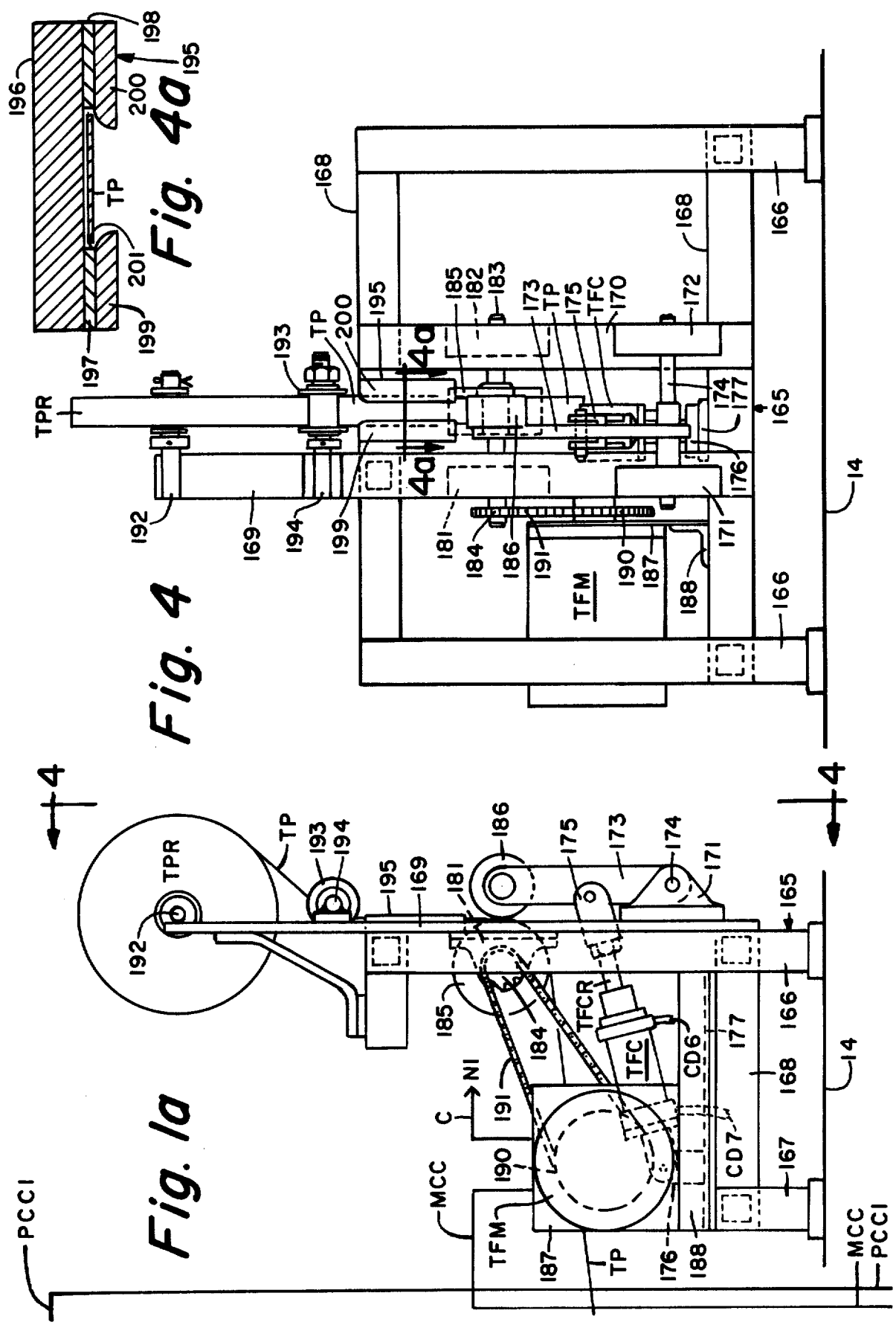

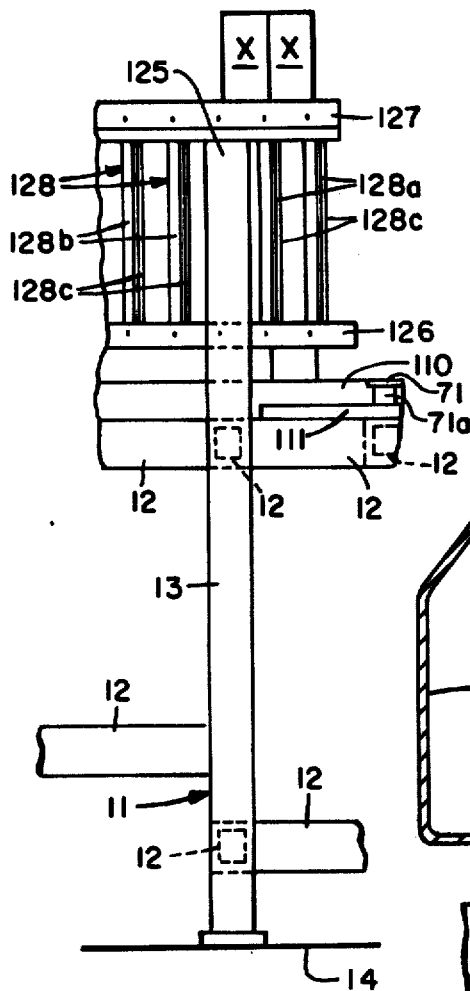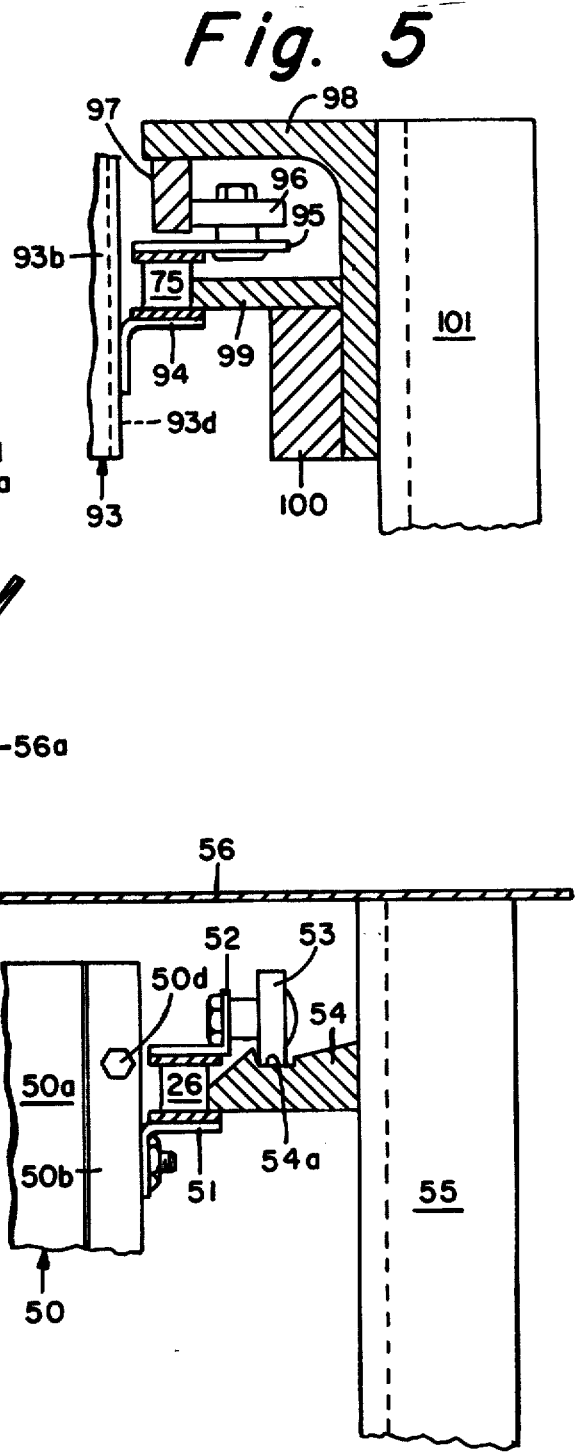

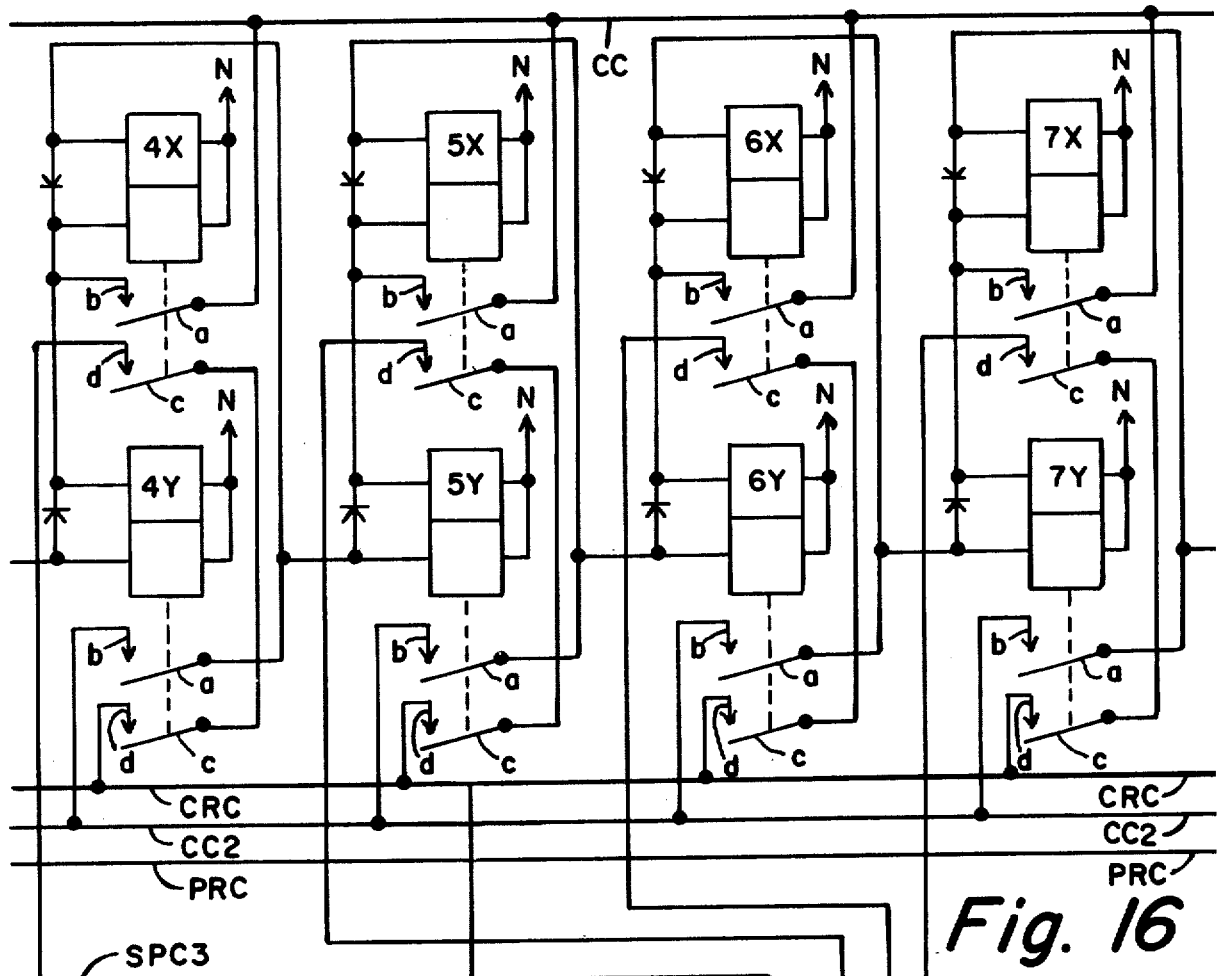
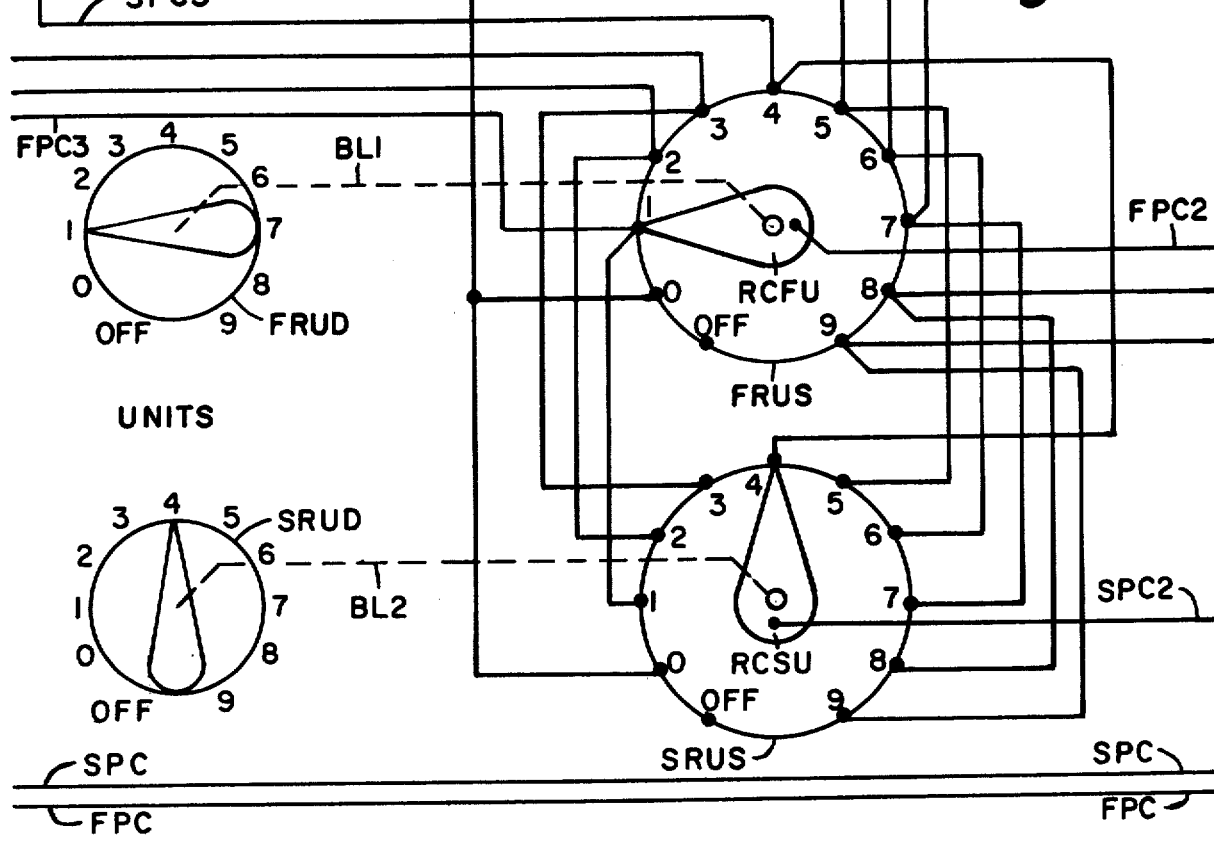
Fig. 16

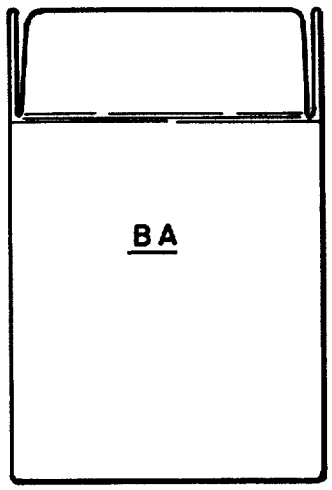
Fig. 19
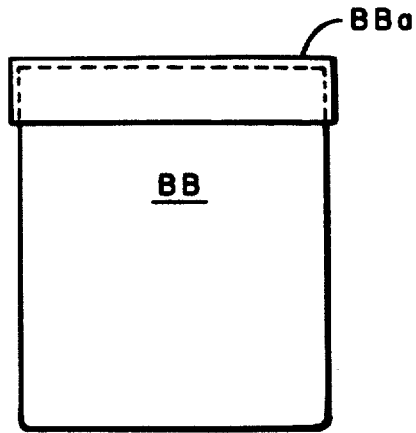
Fig. 20
| Fig. 1 | Fig. 1a | | | | |
|---|---|---|---|---|---|
| | Fig. 13 | Fig. 15 | Fig. 16 | Fig. 17 | Fig. 18 |
| | Fig. 14 | | | | |
Fig. 21

ARTICLE HANDLING APPARATUS

BACKGROUND OF THE INVENTION

In high speed manufacture of large quantities of articles which are also sold, or stored or shipped, in relatively large quantities, it is usually desirable to pack or load substantially equal quantities of the articles into containers, such as paperboard cartons or boxes for example, at relatively high rates of speed commensurate with the speed of manufacture of the articles. When said articles have a high resistance to breakage and/or marring, scoring or scratching thereof, or when the articles are of a type such that marring, scoring or scratching thereof is immaterial, the desired quantities of articles can, for example, be loaded into their respective containers in a relatively rough manner such as by dumping of the articles directly into the containers from a chute or other convenient guide or feed means. When, however, said articles are made of a relatively frangible or relatively easily marred, scored or scratched material, such as glass for example, it is of course desirable or necessary that the articles be relatively carefully loaded into their respective containers, that is, loaded in such manner that breakage or an intolerable amount of marring, scoring or scratching of the articles does not occur. It is, therefore, one object of the present invention to provide an apparatus which will automatically and rapidly load relatively large quantities of cylindrical glass articles into each of a plurality of containers therefor with a minimum of breakage or intolerable marring, scratching or otherwise damaging of the articles as they are being loaded.

It is another object of the present invention to provide an apparatus which will rapidly and automatically load a substantially equal quantity or number of similar longitudinal cylindrical articles into each of a plurality or succession of containers or boxes provided for receiving and packaging of the articles.

It is pointed out that although the apparatus of the invention is optimumly suitable for handling or loading of cylindrical articles made of a material of the type mentioned, that is, articles such as rods or tubes made of glass for example, the apparatus can also be conveniently used for handling or loading of cylindrical articles made of other types of materials, as is believed readily apparent.

Other objects and characteristic features of the invention will become apparent as the description proceeds.

SUMMARY OF THE INVENTION

In accomplishing the above objects of the invention, there is provided an apparatus which intermittently moves each of a succession of similar open top containers, boxes or cartons through a path of movement including three paths of travel or transport comprising a first or box entrance or delivery path, a third box exit or push-out path, and a second box loading path intermediate said entrance and exit paths and including a loading station at which the open top of each box moved thereto is provided with a length of tape extending over the open top of the respective box. The apparatus also includes, adjacent the exit end of a first path of travel through which articles to be loaded into each said box are successively conveyed toward the apparatus, an article guide means which receives said articles and guides them through a second path of travel therefor, such path being coextensive with said first path and having an exit or article ejection end located above said loading station and above said length of tape extending over the open top of each respective container or box moved to the loading station.

Counting means count said articles as they are moved towards the exit end of their said first path of travel, and an additional extremely short length of tape is fed to a box at the loading station each time the counting means count a selected number of articles. Such operation is repeated a selected number of times and the articles are thus slowly lowered by the tape into a box positioned at the loading station, and towards and to the bottom thereof until a final count of articles, predetermined to be the number required to fill the box, has been counted by the counting means. The total length of tape provided for filling each of the boxes with the articles is the same for each box, such total length being determined in accordance with the sum of the distances down an interior end of a box, across the interior bottom thereof from end to end, and up the opposite interior end of the box, that is to say, the sum of twice the interior height of a box plus the interior length of the box. At the end of said final count of articles for a box, the counting means actuates controls to cause the box to be moved from the loading station and a following box moved into such station.

It is pointed out that the apparatus, during a single run or period of operation thereof, handles and loads articles of a single diameter but may, during other runs or periods of operation, handle and load articles of other diameters. That is to say, during one run the apparatus may handle and load a myriad of successions of articles of a first diameter while, during another run, a myriad of successions of articles of another diameter may be handled and loaded by the apparatus. This will, of course, change from run to run the total count of articles loaded into each box during each respective run, that is, the quantity of articles loaded in each box for filling thereof during different runs. Nevertheless, the aforesaid predetermined total length of tape is still provided or dispensed for each box or container and the previously mentioned additional extremely short lengths of tape provided are still of the same length. However, such short lengths of tape are dispensed at different counts of articles of each run, such counts depending on the diameters of the articles being handled and loaded by the apparatus. Such operation will be more readily understood from a more detailed discussion and operational examples of the apparatus as set forth hereinafter.

BRIEF DESCRIPTION OF THE DRAWINGS

In the Drawings:

FIGS. 1 and 1a are front elevational views which when arranged from left to right in that order, as shown in FIG. 21, illustrate an apparatus embodying the invention;

FIG. 3 is a side elevational view of a part of the apparatus embodying the invention, such view being taken generally along line 3—3 of FIG. 2, and being on a slightly larger scale than the views of FIGS. 1 and 2;

FIG. 4 is a side elevational view of the apparatus of FIG. 1a, such view being taken generally along line 4—4 of FIG. 1a;

FIG. 4a is an enlarged cross-sectional and detail view of part of the apparatus of FIG. 4, such view being taken generally along line 4a—4a of FIG. 4;

FIGS. 5 and 6 are enlarged detail views, partially in cross-section, of part of the apparatus shown in FIGS. 1 and 2, such views being taken generally along lines 5—5 and 6—6 of FIGS. 1 and 2, respectively;

FIGS. 13 through 18, taken in conjunction with FIGS. 1 and 1a, and arranged as shown in FIG. 21 along with the latter two figures, schematically illustrate a control system and components thereof for controlling or actuating the other parts of the apparatus of the invention shown in FIGS. 1 through 4; and FIGS. 19 and 20 illustrate, respectively, first and second types of boxes, cartons or containers which can be conveniently employed in practicing the invention disclosed.

Similar reference characters refer to similar parts in each of the figures of the drawings.

PREFERRED EMBODIMENT OF THE INVENTION

Figure 1:
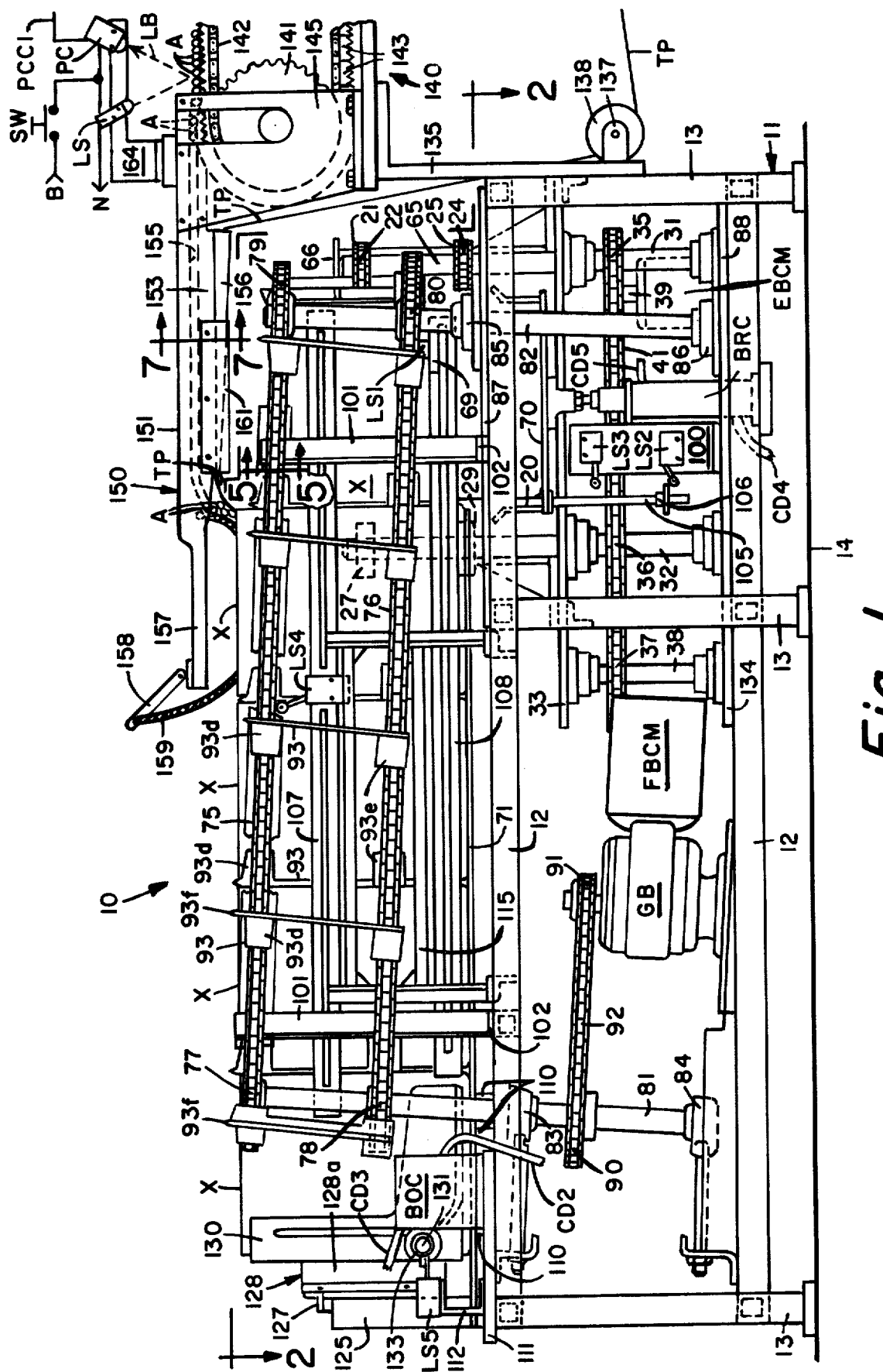
Figure 2:
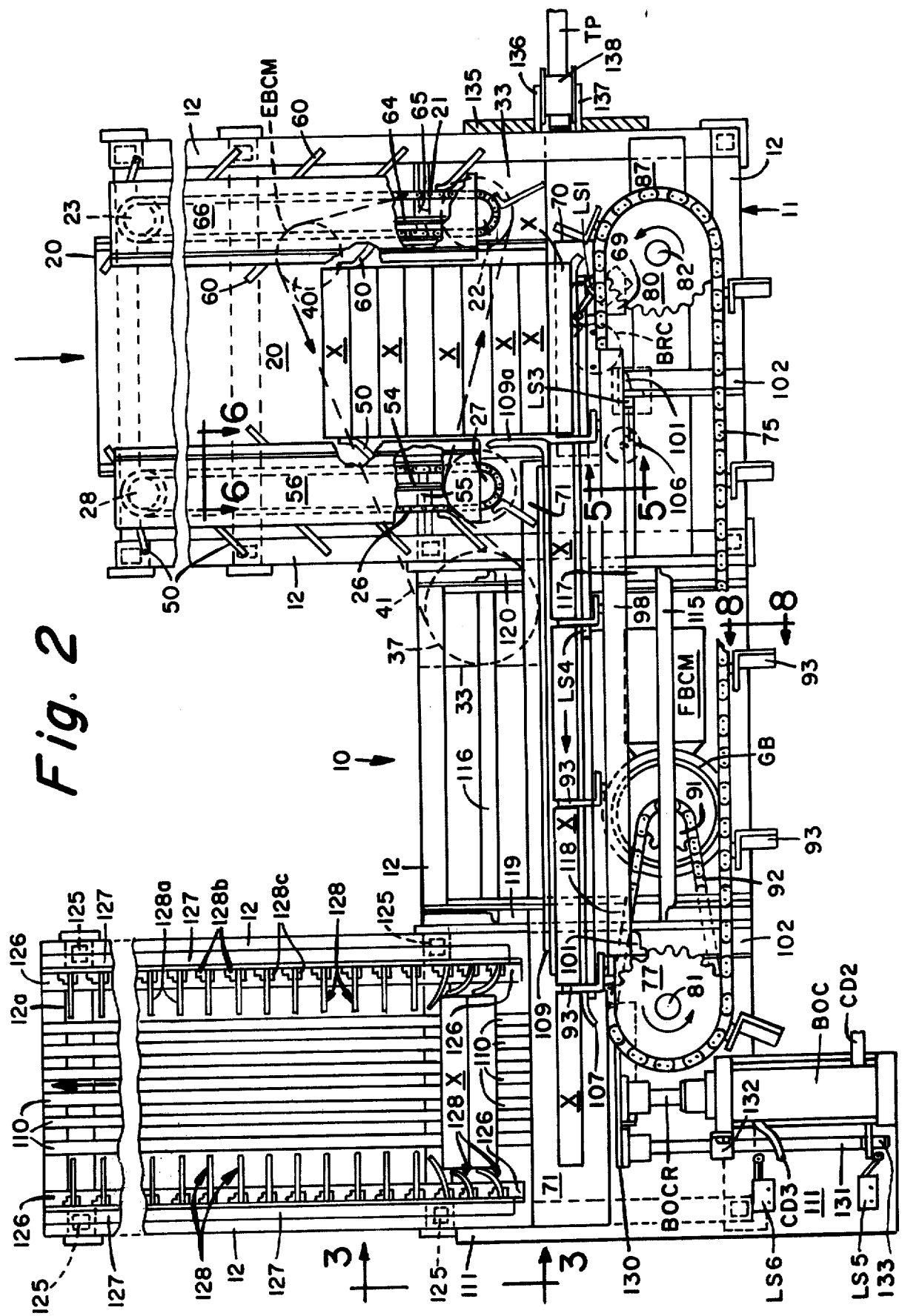
FIG. 2 is a top plan view of a major part of the apparatus of FIG. 1, such view being taken generally along line 2—2 of FIG. 1.

Referring to the drawings in detial and initially to FIGS. 1, 2 and 3 of the drawings taken in conjunction with several of the other figures of the drawings, there is illustrated an apparatus 10 including a main support frame 11 comprising a plurality of horizontal longitudinal and cross members or beams such as 12 and legs such as 13 whose lower ends rest on a floor or the upper surface of a suitable support platform or base such as 14, such members and legs being preferably welded to each other to form the support frame 11 shown.

As previously mentioned, apparatus 10 provides a path of movement for boxes or cartons, such path comprising three, or first, second and third paths of travel or transport for cartons or boxes which are to be filled with articles handled and loaded into such boxes by the apparatus. The first of such paths comprises a box entrance or delivery path to an entry end of which empty cartons or boxes are manually delivered or supplied in the direction of the arrow in the upper right hand area of FIG. 2. The third of said paths (upper left hand area of FIG. 2) comprises a box exit or push-out path through and from which loaded cartons or boxes are pushed and manually removed from the apparatus, the direction of movement of the boxes being indicated by the arrows in the left hand area of FIG. 2. The second of said paths of travel or transport is a box loading path which is intermediate said entrance and exit paths and extends between the exit and entrance ends of such paths, the cartons or boxes being intermittently moved through such second path in the direction indicated by the arrow at approximately the center of FIG. 2. Such second or intermediate path includes, in succession, an initial or preloading station, an article loading station, a box or carton push-out station and first and second intermediate stations located between said loading station and said push-out station, all of said paths of travel or transport being individually discussed in the descriptions which follow.

Referring further to FIGS. 1 and 2, the above mentioned first or entrance or box delivery path includes a relatively long slide pan or chute 20 having a flat bottom of a width slightly greater than the length of the boxes to be moved or transported through the box delivery path, the bottoms of the boxes resting on a smooth upper surface of said bottom and being intermittently moved therealong as discussed below. Pan 20 also includes upwardly extending sides for guiding the boxes as they are slid along said upper surface of the bottom of the pan.

There is provided along the right hand side (viewing FIGS. 1 and 2) of the box entrance path of travel or transport and above the right hand side of pan 20, an upper link chain 21 which extends in an endless loop paralleling almost the full length of said path as best illustrated in FIG. 2. Such chain extends about a drive sprocket 22 located adjacent the exit end of said path and an idler sprocket 23 (FIG. 2) located adjacent the entrance end of said path. A lower link chain 25 (FIG. 1) is also provided and extends in an endless loop directly below chain 21. Chain 25 extends about an idler sprocket and a drive sprocket 24 (FIG. 1) such idler sprocket and drive sprocket being located directly below the corresponding sprockets 22 and 23, associated with chain 21. Chain 25 and its associated sprockets do not appear in FIG. 2 of the drawings since such parts, as mentioned, are located directly below chain 21 and its associated sprockets, as will be readily apparent to those skilled in the art.

There is also provided along the left hand side (viewing FIGS. 1 and 2) of the box entrance path of travel or transport and above the left hand side of pan 20 a pair of upper and lower looped link chains and associated sprockets 27, 28 and 29 which correspond and are arranged similarly to sprockets 22, 23 and 24, respectively, discussed above except that the latter upper and lower chains parallel the left hand side (viewing FIG. 2) of the box entrance path of travel as is believed readily apparent. Sprockets 27 and 29 are drive sprockets for the upper and lower link chains on the left hand side of the box entrance path of travel.

Drive sprockets 22 and 24 are keyed to a drive shaft 31 adjacent the upper end of such shaft (FIG. 1) and for driven rotation thereby. Similarly drive sprockets 27 and 29 are keyed to a drive shaft 32 adjacent the upper end of such shaft and for driven rotation by that shaft. Towards the lower ends of drive shafts 31 and 32, each such shaft is rotatably supported in a pair of suitable bearings which are secured to upper and lower support plates 33 and 34 which are fastened to members of frame 11 as illustrated in FIG. 1. Shaft drive sprockets 35 and 36 are keyed to shafts 31 and 32 between their respective upper and lower support bearings secured to support plates 33 and 34 as mentioned above. An idler sprocket 37 and associated shaft 38 are rotatably mounted in suitable bearings also secured to support plates 33 and 34, and an electric motor EBCM is also securely mounted on the upper surface of support plate 34. The output shaft 39 of motor EBCM has keyed thereto, for driven rotation therewith, a drive sprocket 40 (FIG. 2) and a link chain 41 is looped about sprockets 35, 36, 37 and 40 in a path illustrated by the broken dotted line indicating chain 41 in FIG. 2. The energization of the winding of motor EBCM as hereinafter discussed in more detail, rotates said sprockets and drives chain 41 in the direction indicated by the arrows alongside the borken line path thereof in FIG. 2. This cause counterclockwise rotation of sprockets 22 and 24 to in turn move chains 21 and 25 through their respective looped paths in counterclockwise directions while clockwise rotation is imparted to sprockets 27 and 29 to move their respectively associated chains through their respective looped paths in clockwise directions. This will also be further discussed hereinafter.

Figure 9:
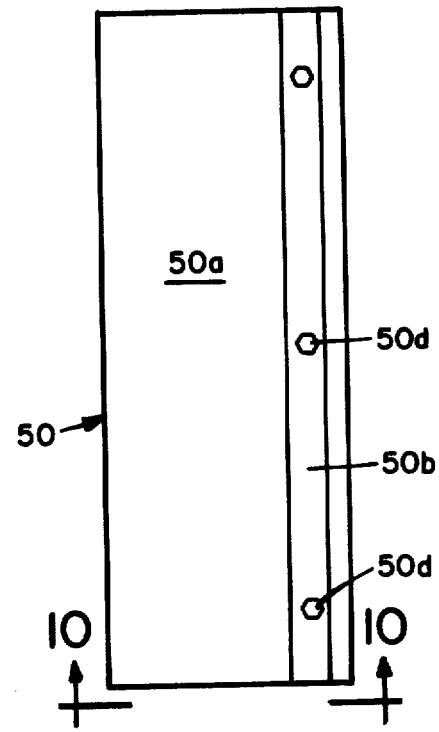
FIG. 9 is an enlarged elevational detail view of another part of the apparatus of the invention.
Figure 10:
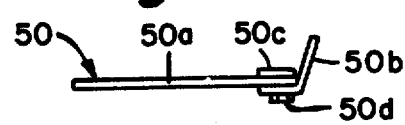
FIG. 10 is a bottom plan view of the part of FIG. 9, such view being taken generally along line 10—10 of FIG. 9.

There is carried by upper chain 26 and its associated lower chain therebelow a plurality of similar box movers, transporters or pushers such as 50 which are evenly spaced apart along the length of said chains. Details of one of such box transporters 50 is shown in FIGS. 9 and 10 of the drawings and such transporter includes a large main portion 50a which is made of a piece of wear resistant flexible fibrous material such as web belting for example. However, the transporters or pushers such as 50 could also be made out of a suitably wear resistant material such as rubber or a flexible plastic if found expedient to do so. Portion 50a of transporter 50 is held, adjacent and along one longitudinal edge thereof, between a rigid angular strip 50b extending the length of portion 50a and a relatively rigid backup strip 50c provided adjacent and along said one edge on the opposite side of portion 50a. Portion 50a is clamped in a usual and well known manner between the two strips by means of suitable screws or rivets such as 50d extending through the strips or clamping members and portion 50a adjacent said one edge thereof, as will be readily apparent from a brief glance at FIGS. 9 and 10 of the drawings.

Referring now to FIG. 6, taken in conjunction with FIGS. 2, 9 and 10 of the drawings, each of said plurality of transporters or pushers such as 50 are attached near their upper ends to upper chain 26 by suitable lower lugs such as 51 which are bolted to their respectively associated transporters and which are fastened to and carried by chain 26 at selected equal intervals along the length of such chain. Each transporter such as 50 is also attached adjacent its lower end to a lug such as 51 which is carried by the lower chain associated with and provided below upper chain 26 as will be readily understood by those skilled in the art.

Upper chain 26 also has attached thereto upper lugs such a 52 which are also securely fastened to such chain, such upper lugs each having bolted thereto a track or channel or groove follower such as 53 which is preferably of a material such as TEFLON for example, As illustrated in FIG. 6, the outer peripheries of each follower such as 53 roll, ride or slide in a suitable groove or channel 54a provided in a track or rail member such as 54 (see also FIG. 21) which is suitably supported along one side of the looped path of movement of chain 26, such track or rail member being so supported by a plurality of spaced apart uprights such as 55 shown in FIGS. 2 and 6, such plurality of uprights being spaced along the length of rail or track member 54 at suitable selected intervals as will also be readily apparent to those skilled in the art. A similar support and guide arrangement is provided for the lower chain associated with chain 26 and includes a rail or track member similar to track member 54 associated with chain 26. Such guide arrangement is also attached to the uprights such as 55 shown in FIGS. 2 and 6. However, such lower guide arrangement is not shown in the drawings for purposes of simplification thereof and since such arrangement would be readily obvious from the arrangement ilustrated in FIG. 6.

It is also here briefly pointed out that a second similar arrangement of box pushers or transporters is provided for chains 21 and 25 located on the right hand side (viewing FIGS. 1 and 2) of the box entrance path of travel or transport, such arrangement including box pushers or transporters such as 60 (FIG. 2) which are of the same construction as the transporters 50 shown in FIGS. 9 and 10, a transporter such as 50 being merely inverted to provide a transporter such as 60. Said second similar arrangement of box transporters also includes upper and lower track or rail members such as 64 which are supported by a plurality of uprights such as 65 (FIGS. 1 and 2) such track members and uprights corresponding to the above discussed track members and uprights such as 54 and 55, respectively, as will be readily apparent. Again, for purposes of simplification of the drawings, details of the box pusher or transporter arrangement for chains 21 and 25 are not shown in detail since it is believed that to do so would be somewhat repetitious or redundant.

Referring further to FIG. 6 taken in conjunction with FIG. 2, a longitudinal box or carton guide member 56 parallels chain 26 along almost the entire length of such chain and thereabove, such guide member being attached to the top ends of the aforesaid uprights such as 55 and the guide member including an upwardly extending side or side portion such as 56a as shown in FIG. 6. A similar box or carton guide member 66 (FIGS. 1 and 2) is attached to the top ends of the aforesaid uprights such as 65 and extends along almost the entire length of chain 21. The upwardly extending sides or side portions of guide members 56 and 66 aid previously discussed pan 20 in guiding boxes or cartons and preventing excessive skew thereof during their movement or transport along the box entrance path of movement, said sides or side portions of guide members 56 and 66 being spaced from each other a distance slightly greater than the length of the boxes being handled.

In the above connection, reference is made to FIGS. 19 and 20 wherein, as previously mentioned, there is shown enlarged side elevational views of first and second types of boxes, cartons or containers, respectively, which may be used with the apparatus of the present invention. The first type of box is designated BA and includes end and side flaps bordering its top edges for closure of the otherwise open top or upper end of the box in a well known manner. The second type of box is designated BB and does not have said end or side flaps but a separate cap type closure such as BBa is used for closure of the otherwise open top or upper end of the box as is believed also well known. When either type of said boxes is used in the apparatus of the invention, the aforesaid guide members 56 and 66 aid pan 20 in guiding the boxes as mentioned above. However, when a box such as BA of the first type is used, said guide members also serve as end flap hold-downs, such end flaps being manually folded downwardly against the ends of the box when the box is inserted into the entrance end of the first path of travel or movement of the boxes and prior to the box being inserted between the guide members 56 and 66.

It is believed expedient to here point out that, when the winding to motor EBCM is energized as hereintofore previously mentioned, each box such as BA or BB is manually supplied to said entrance end of the first path of travel or transport in between the passage, past said entrance end, of a pair of oppositely disposed ones of said pushers or tansporters such as 50 and 60 and the similar passage of the next succeeding such pair of pushers or transporters. Thus, when such succeeding pair of transporters swing about the curve of their respective paths of travel at the entrance end of the first path of travel or transport of the boxes, the free longitudinal edges of the flexible portions of the transporters first contact the ends of the respective box which is then being manually supplied to said entrance end and part of such flexible transporter portions then bend or flex so that a part of the flat surfaces of each such portions move into relatively firm frictional contact with portions of the surfaces of said ends of the respective box. The box is thus frictionally contacted or engaged so that it is transported or moved along pan 20 and between guide members 56 and 66 towards the exit end of the first path of travel of the boxes. At cut-away portions of guide members 56 and 66 the flexible portions of a pair of transporters such as 50 and 60 are shown in FIG. 2 as bent or flexed and thus frictionally contacting or engaging the sides of a box as discussed above. Such a box is so moved until its leading side contacts the trailing side of a preceding box which was similarly moved through said first path of travel of the cartons or boxes. At such time the flexible portions of the pair of transporters or pushers slide along the ends of the box since the force of the frictional engagement or contact therewith is overcome by the immovability of said preceding box and any boxes preceding that box in said first path of travel or transport of the boxes. However, as will become apparent from an operational example of the invention hereinafter set forth, the winding of motor EBCM is seldom energized for extensive periods of time during cycles of operation or runs of the apparatus of the invention and, therefore, the box pushers or transporters such as 50 and 60 are also seldom operating for prolonged periods of time to cause any substantial amount of sliding of the flexible parts of said transporters or pushers along the contacted ends of a box or boxes.

The previously mentioned second path of travel or transport of the boxes or cartons extends from the exit end of the first path of travel discussed above and there is disposed adjacent such exit end, that is, at the exit end of previously discussed pan 20, a lift plate 70 (FIGS. 1 and 2) having a length about equal to the width of said exit end of pan 20, such lift plate being movable between a lowered or down position and a raised or up position as discussed below. In its down position one longitudinal edge of lift plate 70 parallels the edge of the exit end of pan 20 closely thereto and the upper surface of lift plate 70 is even with or very slightly below the upper surface of the bottom of pan 20 so that boxes or cartons can be readily pushed or tansported onto said upper surface of the lift plate. In the up or raised position of lift plate 70, said upper surface of such plate is even with or slightly above the upper surface of a slide plate 71 for the boxes or cartons, the right hand end of such slide plate (viewing FIGS. 1 and 2) paralleling the left hand end of lift plate 70 closely thereto when lift plate 70 is in its up position. Slide plate 71 extends through said second path of travel from adjacent said left hand end of lift plate 70 at the initial or preloading station in the second path of travel to a location somewhat beyond the left hand end of such path and adjacent the entrance end of the aforementioned third path of travel. It is expedient to here point out that the first path of travel or transport of the boxes or cartons is at a lower level than the second and third paths of travel for the boxes and for this reason lift plate 70 is provided at the aforesaid initial or preloading station. The purpose that the first path of travel is at said lower level will be pointed out hereinafter.

Figure 14:
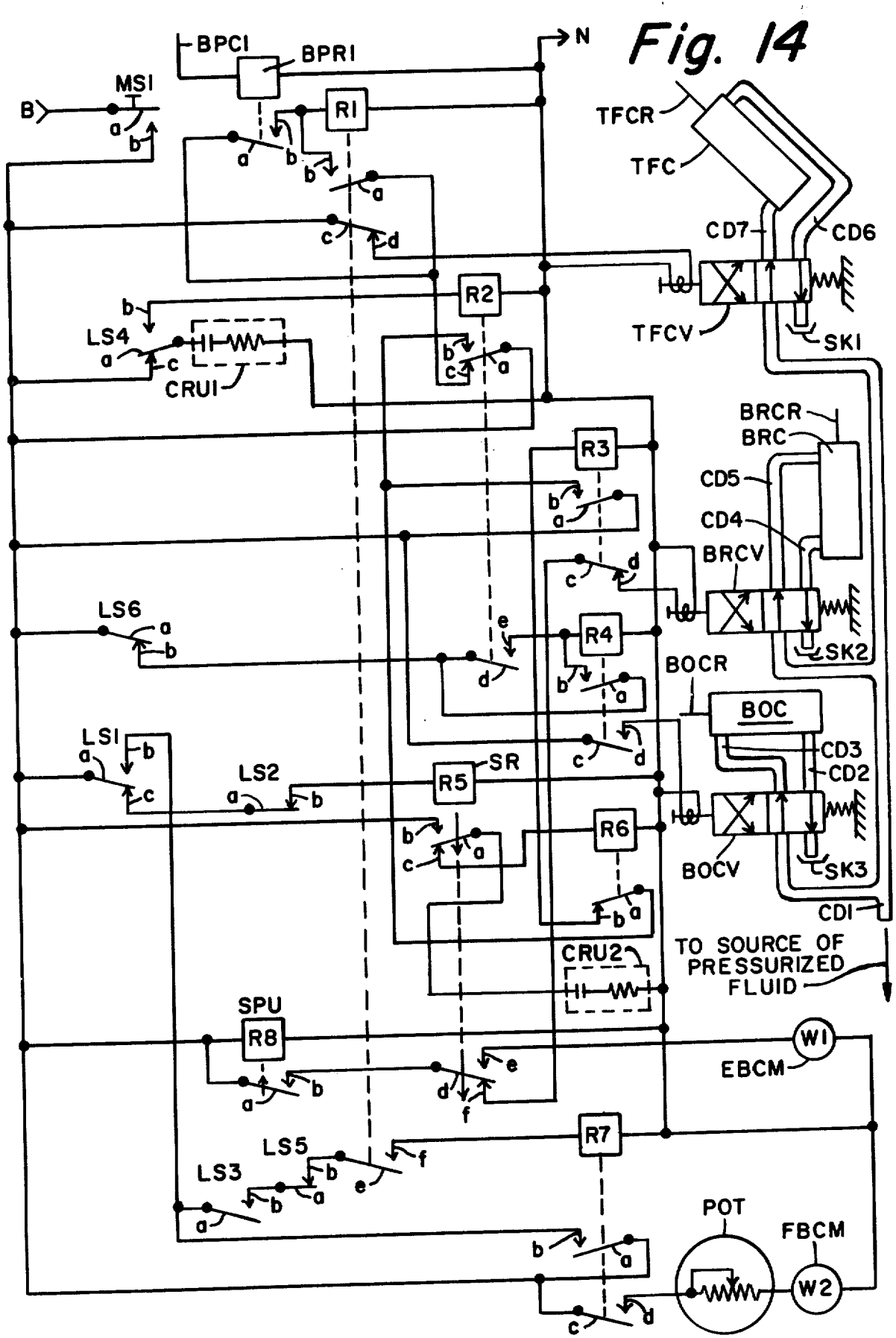

Returning to lift plate 70, such lift plate has associated therewith a motor means for raising and lowering the plate between its up and down positions previously discussed. Such motor means is shown in FIG. 1 as a vertically positioned pressurized fluid cylinder BRC (FIGS. 1, 2 and 14) and associated piston rod BRCR (FIG. 14) whose upper end is secured to the bottom surface of lift plate 70. It is pointed out, however, that said motor could, as well, be of another type such as, for example, an electric soleniod coil and its associated plunger, rod or bar. There is also shown in FIGS. 1 and 14 flexible pressurized fluid conduits CD4 and CD5 attached to cylinder BRC adjacent the bottom and top ends thereof, respectively, and used for selectively supplying said fluid to the cylinder for raising and lowering lift plate 70 as discussed in more detail in an operational example of the invention hereinafter set forth. It will be readily understood that the conduits CD4 and CD5 shown in FIG. 1 are the same conduits CD4 and CD5 shown in FIG. 14 and, thereby, included in the schematic illustration of a control system and associated components for actuating the apparatus of the invention.

As further shown in FIGS. 1 and 2, a pair of associated upper and lower link chains 75 and 76 extend in upper and lower looped paths about a pair of upper and lower driven sprockets 77 and 78, respectively, and a pair of upper and lower idler sprockets 79 and 80, respectively, such pairs of driven and idler sprockets being mounted on a drive shaft and an idler shaft 81 and 82, respectively. Drive sprockets 77 and 78 are suitably keyed to drive shaft 81 for driven rotation therewith as hereinafter discussed, such shaft extending through a suitable rotative upper bearing 83 and into a suitable rotative lower bearing 84, such bearings being mounted in a well known manner so as to be movable in left and right hand directions for tightening or loosening of chains 75 and 76 when desired. Idler sprockets 79 and 80 may either freely rotate on idler shaft 82 or such sprockets may be mounted on such shaft so as to rotate therewith, shaft 82 then extending through an upper rotative bearing 85 and into a lower rotative bearing 86. Upper bearing 85 is attached to the upper surface of a support plate 87 and lower bearing 86 is attached to the upper surface of a similar lower support plate 88 (FIG. 1) which is located vertically beneath support plate 87.

It is pointed out that bearings 83 and 84 are arranged or mounted so that drive shaft 81 tilts from the vertical in a right hand direction (viewing FIG. 1) at a preselected angle. Similarly, bearings 85 and 86 are constructed and are mounted on their respective support plates so that idler shaft 82 also tilts from the vertical at said preselected angle and correspondingly to drive shaft 81. Further, sprockets 77 and 79 are mounted on their respective shafts so as to be aligned with each other for corresponding alignment of chain 75. Sprockets 78 and 80 are likewise mounted on their respective shafts so as to be aligned with each other for corresponding alignment of chain 76. Such arrangement provides for sloping looped paths for chains 75 and 76, such paths sloping or inclining from the horizontal and in the direction from right to left (viewing FIG. 1) upwardly at preselected angle, that is, at an angle equal to the aforesaid angle of tilt of shafts 81 and 82. Said preselected angle of tilt (and, therefore, said angle of slope, of course) is selected in accordance with the length of the second path of travel or transport of the boxes or cartons and said angle may vary considerably, within reasonable limits, as will become more apparent hereinafter. The purpose of the sloping looped paths for chains 75 and 76 will also be made apparent hereinafter.

Returning to drive shaft 81, such shaft is also provided with a sprocket 90 which is keyed in any suitable manner to such shaft for driven rotation thereof as described below. A second electric motor FBCM is provided and there is included therewith a gear reduction box GB whose input shaft is connected with the output shaft of motor FBCM, such motor-gear box arrangements being well known. There is keyed to output shaft of gear box GB in any suitable manner a relatively small drive sprocket 91, and a drive chain 92 loops about sprockets 90 and 91 for imparting rotation to sprocket 90, drive shaft 81, and sprockets 77 and 78, such rotation being such as to drive the latter in counterclockwise directions (viewing FIG. 2) and corresponding movement of chains 75 and 76 through their looped paths of travel when the winding of motor FBCM is energized as hereinafter discussed. The energization of the winding of motor FBCM is periodic or intermittent as also hereinafter described, and said chains 75 and 76 are correspondingly intermittently or periodically driven at relatively low speeds for a purpose which will also be set forth hereinafter.

A plurality of box movers or pushers such as 93 (FIGS. 1, 2, and 8) are attached adjacent their upper and lower ends to upper and lower chains 75 and 76, respectively, such pushers being evenly spaced apart along the looped lengths of said chains. Each box pusher such as 93 has an L-shaped end configuration as best illustrated in FIG. 2, and part of the center portions of the pushers are cut out as illustrated by the configuration of the pushers such as 93 illustrated in FIG. 1 taken in conjunction with the configuration of the pusher 93 illustrated in FIG. 8.

Figure 8:
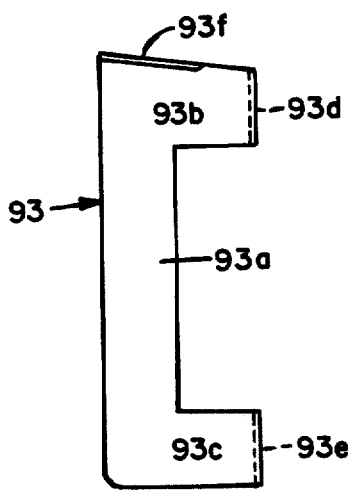
FIG. 8 is an enlarged elevational and detail view of a part of the apparatus embodying the invention, such view being taken generally along line 8—8 of FIG. 2.

Referring to one of the pushers 93 of FIG. 1 and the other view of such a pusher as shown in FIG. 8, it will be seen that each pusher such as 93 includes a main vertical portion 93a which connects with first ends of upper and lower horizontally extending end portions 93b and 93c whose second or free ends 93d and 93e, respectively, are horizontally bent at 90°angles from the remainder of pusher 93 as best illustrated in FIG. 1. The main portion 93a of each pusher such as 93 is a box contacting portion of the pusher, the bent over ends 93d and 93e are parts for attachments of each respective pusher to chains 75 and 76 as discussed below, and portions 93b and 93c of each pusher are portions for connecting main portion 93 with ends 93d and 93e and, thereby, to said chains. The aforesaid cut-outs of the center portions of the pushers such as 93 permit clearance of certain parts of the apparatus as is believed will become more apparent hereinafter. The upper edge of portion 93b of each pusher slopes or slants downwardly in a direction toward the ends of such portion and the length of such upper edge of portion 93b above main portion 93a is ground to provide a knife edge 93f as best illustrated in FIG. 8 but as also indicated in FIG. 1. The purpose of such knife edges are to provide for cutting of lengths of tape as hereinafter described. It should be pointed out that the box pushers or transporters such as 93 are made of relatively rigid and smooth metal such as stainless steel, for example.

Referring to FIG. 5, there is shown a small part of the upper portion 93b of a pusher 93 including a part of the bent-over end 93d of said upper portion 93b, such drawing figure illustrating the method of atachment of the upper end of a pusher such as 93 to the aforesaid upper chain 75. An inverted L-shaped lug 94 is attached to the bottom of one of the links of chain 75 and to said bent-over end 93d of portion 93b of pusher 93. There is also attached to the upper side or top of said one chain link a horizontally extending support member 95 which has bolted to the upper side of its otherwise free end a rail follower 96 which slides, rolls or otherwise follows along the back side of a depending rail 97 suspended from the underside of an overhang part of an inverted L-shaped and longitudinal rail support and cover member 98 (see also FIG. 2) which, along with rail 97, extends along a substantial length of the inner side of the looped path of chain 75, that is, the side of such path which is adjacent or near the aforesaid second path of travel or transport of the boxes.

First and second longitudinal metal strips 99 and 100 are secured to each other and to said rail support and cover member 98 below said otherwise free end of support member 95, such strips extending for the entire length of member 98. Strip 99 is positioned below said member 95 so as to maintain said end of such support member and rail follower 96 from moving out of the guide passage formed by the combination of depending rail 97, the overhanging part of rail support member 98, and said metal strip 99, during the movement of chain 75 through said substantial length of the inner side of the looped path of such chain. Rail support and cover member 98 is secured to a pair of urights such as 101 having feet such as 102 (FIGS. 1 and 2) secured to channel members of frame 11 for support of the uprights. It is pointed out that a support arrangement similar to that just described is provided for the attachment of the lower ends of the pushers of transporters such as 93 to chain 76 and such similar support arrangement is also supported by the uprights such as 101, and also extends through a substantial length of the inner side of the looped path of such chain, that is, the side of such path which is adjacent or near the aforesaid second path of travel or transport of the boxes. It is also pointed out that a plurality of inverted L-shaped pusher support lugs such as 94 (FIG. 5) are provided along the full lengths of each of the chains 75 and 76. This is further discussed below.

It is believed obvious that the box pushers or transporters such as 93 should be vertical when they are contacting or bearing against an end of a box to be pushed or transported as illustrated in FIGS. 1 and 2. Therefore, since chains 75 and 76 move in sloping or inclining looped paths, the box pushers or transporters should extend across and be attached to chains 75 and 76 at angles or an angle other than a 90° angle. To this end, the pushers or transporters such as 93 are attached to said chains so that, during both downslope and upslope movement of the pushers by the chains moving through their looped paths of travel, the leading or box contacting faces of the pushers extend across each chain at angles, above and below each respective chain, of less and greater than 90°, respectively, that is, at acute and obtuse angles, respectively. Such angles depend on the previously discussed preselected angle of tilt of shafts 81 and 82 from the vertical which, as previously mentioned, is also the angle of slope of the looped paths of travel of the chains from the horizontal. If said preselected angle of tilt is 8° for example, said acute and obtuse angles at which the pushers such as 93 extend across chains 75 and 76 are 82° and 98°, respectively. It is believed expedient to here point out that parts such as 94, 95 and 96, discussed above in reference to FIG. 5 of the drawings, are provided on chain 75 on selected links of such chain, that is, at selected spaced-apart points or locations about the full looped length of chain 75, the spacing between said selected chain links, or points or locations about the chain being such that the spacing between the box pushers or transporters such as 93 attached to chain 75 (and chain 76) is preferably just slightly greater than the outside length of each box including, if any, the thickness of the bent-down closure flaps at the ends of the box.

A first pair of upper and lower box guides 107 and 108, respectively, are provided adjacent and parallel to the front side of the second path of travel or transport of the boxes (FIGS. 1 and 2) and a second pair of similar box guides such as 109 (FIG. 2) are provided adjacent and parallel to the rearward side of said second path of travel. A first support frame 115 supports an upper pair of horizontally extending arms such as 117 and 118 (FIG. 2) which extend between the upper and lower chains 75 and 76 and support, on the otherwise free ends thereof, upper box guide 107. The aforementioned cut-outs of the box pushers such as 93 are embodied in such pushers to provide for clearance between such pushers and said arms 117 and 118. Frame 115 also supports a second horizontally extending pair of lower arms similar to said arms 117 and 118, and which extend below lower chain 76 and support on the otherwise free ends thereof, lower box guide 108.

A second support frame 116 is provided to the rear of the rear box guides and supports a pair of upper horizontally extending arms such as 119 and 120 which support, on the otherwise free ends thereof, upper rear box guide 109. Support frame 116 also supports a pair of lower horizontally extending arms similar to said arms 119 and 120 and which support on their otherwise free ends the previously mentioned lower rear box guide located below box guide 109.

It is pointed out that the front and rear box guides discussed above are supported so that the surfaces of the front and rear guides which face each other across said second path of travel are separated a distance just very slightly greater than the width of each of the boxes being handled. Such guides are also positioned so that the vertical plane of the centerline of the distance between said facing surfaces corresponds to or coincides with the vertical plane of the longitudinal centerline of said second path of travel of the boxes. It will be noted that upper rear box guide 109 is bent adjacent its right hand end (viewing FIG. 2) at a 90° angle so that a short length 109a of such guide extends parallel with the left hand side (also viewing FIG. 2) of the previously discussed first path of travel or transport of the boxes. Such short length 109a of box guide 109 prevents boxes, which are transported through said first path of travel, from moving or creeping too far to the left (again viewing FIG. 2) after such boxes are moved from between the aforementioned sides of the box flap hold-down and guide members 56 and 66 previously discussed, as well as providing a hold-down means for the left hand end closure flap (viewing FIG. 2) when the boxes being handled have top closure flaps as previously mentioned.

Returning to previously discussed lift plate 70, there is shown attached to such lift plate, adjacent the left hand front corner thereof when viewing FIGS. 1 and 2, a rod, bar or shaft 105 which extends downwardly from lift thereof, 70 and has secured thereto, adjacent the lower end tereof, a circularly flanged collar or bushing 106. There is also shown, to the right of shaft 105, and L-shaped support bracket 100 whose lower or foot portion is attached to the upper surface of support plate 88 (FIG. 1). Plate 88 supports on its front face a pair of lower and upper limit switches LS2 and LS3 whose actuating arms extend so as to be contacted and actuated by the flange of said collar or bushing 106 according as lift plate 70 and, therefore, shaft 105 is in its down or lowered, or raised or up positions, respectively. Limit switches LS2 and LS3 are electrical circuit controlling switches each of which has a pair of electrical circuit controlling contacts a-b (FIG. 14) the movable contact members of which are normally spring biased to open or circuit interrupting conditions and are actuated to closed or circuit closing conditions whenever their respective actuating arms are actuated by flanged bushing 106 as mentioned above. When lift plate 70 is in its lowered or down position as shown in FIG. 1 the actuating arm of switch LS2 is actuated and, therefore, the circuit controlling contacts a-b of such switch are closed at such time as hereinafter further discussed in conjunction with FIG. 14.

It is considered expedient to here point out that several additonal limit switches similar to LS2 and LS3 are employed, such switches being designated LS1, LS4, LS5 and LS6, and the respective switches being shown in FIGS. 1 and 2 and, being located and actuated as follows, and having the following described features.

Switch LS1 is a limit switch whose actuating arm is contacted and actuated by a box or carton moved onto or resting on lift plate 70. It is, therefore, located above such lift plate and above the limit of upward travel of such plate and at the preloading or initial station in the second path of travel and adjacent the aforesaid exit end of the previously discussed first path of travel or transport of the boxes and cartons as shown in FIGS.

1 and 2, such exit end coinciding with the initial station at the entrance end of the second path of travel or transport of the boxes. Limit switch LS1 has a set of circuit controlling transfer contacts including a movable contact or contact member $a$ and fixed contacts or contact points or members $b$ and $c$. (FIG. 14). Contact or contact member $a$ is normally spring biased to a circuit closing condition or position against contact or contact point $c$ of the switch and contacts $a$-$b$ of the switch are normally in an open or circuit interrupting condition. When the actuating arm of the switch is actuated as mentioned above, contact $a$ is actuated from the closed condition with contact $c$ and is actuated into a closed condition with contact or contact point $b$. Contact member $a$ of switch LS1 is shown in FIG. 14 in the position it occupies when no box or carton is on lift plate 70. Limit switch LS1 is supported, in its said locations, by a support plate which, when viewing FIG. 1 of the drawings, is secured to the front of box guide 108, previously discussed.

Limit switch LS4 is similar to limit switch LS1 and is located along the aforesaid second path of travel of boxes or cartons at the exit end of the loading station in such path as shown in the region of the centers of FIGS. 1 and 2, such switch LS4 being attached directly to the front of box guide 107 (viewing FIG. 1). Contacts $a$-$c$ of such switch (FIG. 14) are normally spring biased to closed and become opened when a carton or box contacts the actuating arm of the switch, that is, when a box has been moved completely into or to the end of the loading station in the second path of travel of the boxes. Contacts $a$-$b$ of the switch are closed at such time. This will be discussed hereinafter.

Limit switches LS5 and LS6 are located at the exit end of said second path of travel, that is, adjacent to the entrance end of the aforesaid third path of travel or transport of the boxes or cartons as shown at the left hand side of FIGS. 1 and 2. Each such limit switch is supported on a suitable support bracket such as 112 (FIG. 1) whose lower feet are secured to the upper surface of a support plate 111 to be hereinafter discussed. Limit switches LS5 and LS6 are associated with a pressurized fluid motor or motor means including a fluid cylinder BOC and associated piston rod BOCR discussed below in more detail. It is sufficient to here point out that contacts $a$-$b$ (FIG. 14) of switch LS5 are spring biased to an open condition but are actuated to a closed condition when said piston rod BOCR is retracted within cylinder BOC, that is, is in its retracted position as shown in FIG. 2. Contact $a$-$b$ are, therefore, shown closed in FIG. 14. Contacts $a$-$b$ of switch LS6 are spring biased to a closed condition as shown in FIG. 14 and are actuated open whenever said piston rod BOCR is extended, as hereinafter discussed.

For purposes of simplification of the drawings, the conductors for the electrical circuits controlled by the contacts of the limit switches are not shown in FIGS. 1 and 2 of the drawings but such circuits are schematically illustrated in FIG. 14 and the electrical connections to said switches will, therefore, be readily apparent to those skilled in the art after a discussion of FIG. 14 in an operational example of the invention hereinafter set forth. Similarly, electrical connections to the windings of previously discussed electric motors EBCM and FBCM, shown in FIGS. 1 and 2, are not shown in such draiwng figures but such windings for motors EBCM and FBCM are shown in FIG. 14 and are designated W1 and W2, respectively, said electrical connections to the circles which represent the motor windings being schematically shown in said FIG. 14 as will also be readily apparent to those skilled in the art.

With reference to FIGS. 1 and 2 and 3 of the drawings, and especially to FIGS. 2 and 3, the third path of travel or transport of the boxes or cartons is shown in the upper left hand part of FIG. 2. There is included in such path a plurality of six spaced apart and relatively smooth metal horizontally extending and parallel slats or strips such as 110 which extend from adjacent the entrance end of said third path (box push-out station at the exit end of the aforesaid second path of travel or transport) to a location where the boxes or cartons being transported are manually removed from the apparatus. The slats or strips such as 110 rest on the beams such as 12 of frame 11 at the entrance end of the third path of travel and on a short cross beam 12$a$ at the exit end of such path. The strips such as 110 are of a thickness such that the top surface thereof is even or level with or is slightly below the top surfaces of slide plate 71 as illustrated in FIG. 3. Where the strips adjoin slide plate 71 the upper edges of the strips are of a lesser thickness so as to extend beneath slide plate 71 and rest on the top surface of the beam or member such as 12 which supports slide plate 71 adjacent its left hand edge (when viewing FIG. 3). Spacers such as 71$a$ (FIG. 3) are employed to support the relatively thin slide plate 71 adjacent said edge and above the level of the beams or support frame members such as 12.

There is provided along the sides of the third path of transport or travel of the boxes a plurality of strong upright supports such as 125 (FIGS. 1, 2 and 3) which, as illustrated in FIG. 3, are preferably provided above each leg such as 13 in vertical alignment with each respective such leg. The uprights such as 125 are securely attached to the upper ends of their respectively associated legs such as 13 or to the upper surfaces of the beams such as 12 extending the length of the third path of travel. A pair of lower L-shaped beams or lengths of angle iron such as 126 (FIGS. 2 and 3) extend from the exit end of the third path of travel almost to the entrance end of such path such beams being attached to said uprights such as 125 with the bases thereof extending in a direction inwardly toward the center of the path of travel, that is, with the sides of the L-shaped beams extending upwardly and in flush contact with the inner faces or facing surfaces of the uprights such as 125, there being one of such pair of beams or lengths of angle iron extending down each side of the third path of travel. The beams are, as illustrated in FIG. 3, attached to said uprights at a selected distance above the upper surfaces of the slats or strips such as 110 for a purpose hereinafter discussed.

A pair of upper L-shaped beams or lengths of angle iron such as 127 are secured to the upper ends of the uprights, such as 125 and extend along the sides of the third path of travel, such beams being about equal in length to the aforesaid beams such as 126. The bases of the L-shaped beams such as 127 rest on top of uprights such as 125 and are secured thereto, such bases extending in a direction outwardly from the center of said third path of travel, that is, in a direction opposite to the bases of said beams such as 126. The sides of the beams such as 127 extend upwardly and there is one such beam extending along each side of the third path of travel. The upright or upwardly extending sides of the lower and upper L-shaped beams or lengths of angle iron on each side of said path of travel are in vertical alignment with each other. That is to say, the surfaces of the upright sides of the lower lengths of angle iron or L-shaped beams on each respective side of the third path of travel and which face the center of such path, extend in the same vertical plane as the surfaces of the upright sides of the upper lengths of angle iron or L-shaped beams on the corresponding side of the third path of travel and which also face the center of such path.

There is attached to each associated pair of said beams, such as 126 and 127, a plurality or succession of box stabilizers or supports such as 128 (FIGS. 1, 2, and 3) which are similar in construction to the box pushers or transporters such as 50 and 60 provided in the first path of travel or transport of the boxes and previously discussed. The difference of the box stabilizers or supports such as 128 from said pushers or transporters such as 50 and 60 is that the flexible portions 128a of the box stabilizers are attached to said beams such as 126 and 127 so that the stabilizers extend at 90° angles from such beams in a direction towards the centerline of the third path of travel or transport of the boxes. Each stabilizer such as 128 includes a flexible portion 128a as previously mentioned and which may be made from a suitable piece of flexible web or fibrous belting material, or a suitable rubber material or flexible plastic for example. Each said stabilizer also includes a rigid L-shaped strip 128b and a relatively rigid backup strip 128c for the strip 128b. Such strips extend along the height of the flexible part 128a adjacent one edge thereof but abutting against opposite faces of the strip. The strips are then connected to each other by suitable screws, bolts or rivets and with the flexible part 128a clamped therebetween as illustrated in FIGS. 2 and 3 and as is well known for clamping and holding of parts such as 128a.

As mentioned above a plurality of the box stabilizers such as 128 are provided along each associated pair of beams such as 126 and 127 and the stabilizers attached to each pair of said beams are the same as those attached to the other pair of such beams except that they are inverted. That is to say, the stabilizers on the opposite sides of the third path of travel of the boxes are inverted or upside down from each other. This is believed readily apparent.

The plurality or succession of stabilizers on each side of the third path of travel are equally spaced apart from each other along the length of such path and are attached to their respectively associated beams such as 126 and 127 by securing the L-shaped strips such as 128b to such beams as illustrated in FIGS. 2 and 3. Said spacing between successive ones of the stabilizers is preferably slightly less than the width of the boxes to be handled. The successions of stabilizers on opposite sides of the third path of travel are attached to their respective pairs of beams so that the corresponding stabilizers of said successions thereof are substantially directly opposite or in alignment with each other in lines extending across the third path of travel normal thereto.

Returning to the entrance end of the third path of travel, or to the previously mentioned box push-out station in the second path of travel, there is shown in FIGS. 1 and 2 the previously mentioned pressurized fluid cylinder BOC and its associated piston rod BOCR (see also FIG. 14) such components being a motor means for ejecting or pushing boxes out of said station, that is, out of the exit end of the second path of travel and into the entrance end of the third path of travel. Piston rod BOCR has attached to its otherwise free end an L-shaped and vertically disposed push-out plate 130 which has, opposite the face of the plate which is attached to said end of piston rod BOCR, a relatively smooth and vertical face which is actuated into contact with a side of each of the boxes to be ejected or pushed out of and into said exit and entrance ends of said second and third paths of travel, respectively, as hereinafter described. Pressurized fluid cylinder BOC is firmly secured to the upper surface of the previously mentioned support plate 111 which is secured to the upper surfaces of the support members or beams such as 12 of frame 11 at the left hand side of FIGS. 1 and 2 when viewing said drawing figures. It is pointed out that although the motor means for actuating box push-out plate 130 is shown in the drawings as a pressurized fluid cylinder and associated piston rod, other motor means, such as an electric solenoid coil and associated rod or plunger, for example, could be used for actuating the push-out plate.

There is secured to the same face of push-out plate 130 that is attached to the otherwise free end of piston rod BOCR, a guide rod which also extends snugly but longitudinally movable through a sturdy guide bearing 132 attached to cylinder BOC as best shown in FIG. 2. The lower surface or edge of push plate 130 is located slightly higher than slide plate 71 extending through the second path of travel of the boxes and, therefore, such push plate is supported solely by piston rod BOCR and guide rod 131, while cylinder BOC supports both such rods and support plate 111 supports all of such components. Guide rod 131 stabilizes push plate 130 and prevents piston rod BOCR from rotating and such rod 131 is also provided with a flanged bushing or collar 133 which is immovably attached or keyed to the rod at a selected location therealong. Such location and the location of the previously mentioned limit switches LS5 and LS6 being selected, in accordance with the reciprocative movement of piston rod BOCR and, thereby, of plate 130, so that the actuating arm of limit switch LS5 is actuated, as previously discussed, by the flange of said bushing 133 when piston rod BOCR and push-out plate 130 are retracted, and the actuating arm of limit switch LS6 is actuated, as also previously mentioned, by the flange of bushing 133 when piston rod BOCR is extended. There is connected to the front and rear ends of cylinder BOC flexible pressurized fluid conduits CD2 and CD3, respectively, which are used for selectively supplying said fluid to the cylinder for actuating push-out plate 130 as discussed in more detail in an operational example of the invention hereinafter given. It will be readily understood that conduits CD2 and CD3 shown in FIGS. 1 and 2 are the same conduits CD2 and CD3 shown in FIG. 14 and, thereby, included in the schematic illustration of a control system and associated components for actuating the apparatus of the invention.

When box push-out plate 130 is actuated by piston rod BOCR of cylinder BOC and by pressurized fluid being supplied over conduit CD2 to such cylinder, the plate contacts a box then at the push-out station or exit end of the second path of travel of the boxes and ejects or pushes such box off of slide plate 71 and onto the strips such as 110 in the third path of travel of the boxes. Each box so pushed or moved contacts the last one of the previous boxes, that is, the immediately preceding box if any, pushed or moved into the entrance end of the third path of travel. As illustrated in FIG. 2, the boxes moved or pushed into said third path contact and bend the flexible parts 128a of the box stabilizers such as 128 and such stabilizer parts are thus moved into frictional contact with the ends of the boxes to maintain the boxes in their upright position as they are transported along the third path of travel or transport. Each preceding box in said path is, therefore, pushed or moved by the next succeeding box in such path and, as each box reaches the exit end of the path, it is manually removed therefrom for closing thereof and further handling such as storage or shipment.

Figure 11:
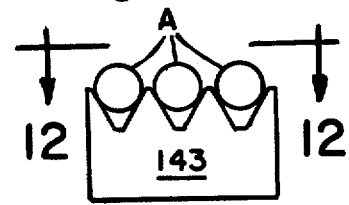
FIG. 11 is an enlarged elevational and detail of a part of an article conveyor used in conjunction with the apparatus of the present invention, such view showing a plurality of articles being transported by the conveyor.
Figure 12:
FIG. 12 is a top plan view of the part of the article conveyor and the articles shown in FIG. 11, such view being taken generally along line 12—12 of FIG. 11.

With reference now to FIG. 1, taken in conjunction with FIGS. 11 and 12, there is shown, in the area of the upper right hand corner of FIG. 1, an exit end of a conveyor assembly designated generally by the reference character 140 and including a rotatably mounted idler sprocket wheel 141 about which loops a link chain assembly 142 to which is attached a plurality or succession of article carrier blocks such as 143 (FIGS. 11 and 12) each of which is illustrated as having three grooves or channels for carrying a plurality of three relatively elongate cylindrical articles such as A of a type which are to be delivered to the apparatus of the present invention and then handled and loaded into the previously discussed cartons or boxes in practicing the invention herein disclosed. The article carrier blocks such as 143 could as well have one or two grooves or channels for conveyance of articles such as A; sprocket wheel 141, and chain 142, could be of a different size than that shown; and the diameters of the articles such as A could be other diameters. However, conveyor assembly 140 does not, per se, form part of the present invention but is shown as being connected with the apparatus shown in FIG. 1 for the purpose of illustrating one means for delivering or supplying articles to be handled or loaded in the boxes or cartons also handled by the apparatus of the present invention as mentioned above. Conveyors or conveyor assemblies such as 140 have long been used and are old in the art but it is expedient to point out at least one feature of a conveyor assembly such as 140 that is useful when such a conveyor assembly is used with the apparatus of the present invention.

As illustrated in FIG. 12, the cylindrical articles such as A are transported or conveyed by the carrier blocks 143 so that the articles are not contacted by such carrier blocks along the full lengths of the articles, that is, so that a substantial part of the length of each article extends over or overhangs the ends of the carrier blocks. This feature facilitates the delivery of the articles from the carrier blocks to the apparatus of the present invention. Said overhang feature, along with the additional feature that the articles such as A are spaced a small distance apart when being carried by the blocks such as 143, is also sometimes useful in practicing the present invention as hereinafter pointed out.

Returning to FIG. 1, an inverted L-shaped bracket 135 is secured to the right hand end of frame 11 (viewing FIG. 1). The bracket 145 of the above discussed conveyor assembly 140, and which rotatably supports sprocket wheel 141, is attached to the top surface of the horizontally extending part of bracket 135 and the apparatus of the present invention is thus connected with assembly 140 for receipt of cylindrical articles for loading thereof as hereinbefore mentioned. It is pointed out that said bracket 135 is located in relation to the previously discussed longitudinal centerline of the second path of travel of the boxes so that said bracket 145 of conveyor assembly 140 can be and is located on said upper surface of bracket 135 and attached thereto with the longitudinal centerline of conveyor chain 142 and, therefore, the corresponding centerlines of the carrier blocks such as 143, in alignment or aligned with the aforesaid centerline of the second path of box travel. Bracket 145 is, in actuality, a modified bracket so that there can be supported, at the upper end thereof, an article transport, pickup or receiving means 150 hereinafter referred to as a stripper 150 since it, in effect, strips the articles such as A from the conveyor assembly 140, that is, off of the carrier blocks such as 143 of the conveyor assembly.

Figure 7:
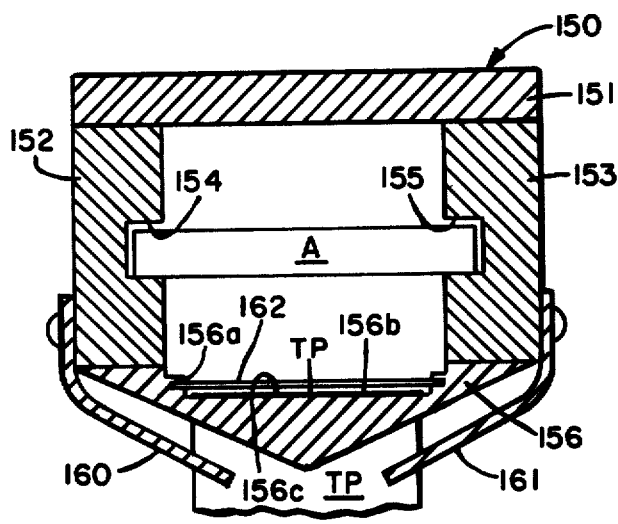
FIG. 7 is an enlarged cross sectional and detail view of part of the apparatus of FIG. 1, such view being taken generally along line 7—7 of FIG. 1.

Referring to FIG. 7, taken in conjunction with FIG. 1, stripper 150 is shown as including a longitudinal top cover member 151 which is attached in any convenient manner to the top edges of a pair of longitudinal side strips or members 152 and 153 which embody similar recesses or channels 154 and 155, respectively, which extend for a substantial part of the length of the side members 152 and 153. Stripper 150 also includes a bottom member or strip 156 having a triangular cross-sectional shape and which is attached in any convenient manner to the bottom edges of said side strips 152 and 153. It will be seen that top and bottom members 151 and 156 act as spacers for maintaining the side strips 152 and 153 a selected distance apart throughout the length of such side strips and, thereby, the ends of the channels 154 and 155 the same distance apart throughout their length in strips 152 and 153. Such distance is just slightly in excess of the length of an elongate cylindrical article such as A (FIG. 7) which is illustrated and described hereinafter as being handled by the apparatus disclosed.

With reference to the right hand end (viewing FIG. 1) of stripper 150, it will be noted that channel 155 in side 153 of the stripper slopes gently downward so that the corresponding overhanging end of each successive article such as A (FIG. 12) is pushed into such channel by the carrier blocks 143 of conveyor assembly 140 by such blocks being moved by chain 142 of such assembly. It will be readily apparent that channel 154 in side 152 of stripper 150 also slopes gently downward for receiving the other overhanging ends of the articles such as A. The articles such as A are thereby received, removed from, or stripped from, the conveyor assembly 140, that is, from the carrier blocks such as 143 of such assembly. Near the left hand end of stripper 150 channel 155 (and channel 154) slopes relatively abruptly downward for ejection of the articles such as A from exit ends of such channels of the stripper for purposes hereinafter discussed. Each succeeding article such as A received or stripped from the carrier blocks 143 of conveyor assembly 140 is pushed into contact with each respective immediately preceding article in the channels of the stripper and all of such articles are thereby pushed or moved along the lengths of said channels by each respective succeeding article fed or pushed into the stripper, that is, received from the carrier blocks such as 143.

Stripper 150 may handle cylindrical articles having smaller diameters than article A shown in FIG. 7 but there is a lower limit to such diameters since articles of too small a diameter will tend to overlap or pile up on one another and can, thereby, cause jamming of the stripper channels. Therefore, if articles of much smaller of a diameter than article A are to be handled or loaded, stripper 150 must be changed to one having more narrow channels than channels 154 and 155. For such reason it is expedient to attach stripper 150 to support bracket 145 so that the stripper may be rapidly removed and replaced if found necessary to do so. However, a stripper having adjustable height channels could be used in place of stripper 150 shown. Although the apparatus of the present invention is intended to handle (within limits) articles having diameters different than the diameter of article A shown in FIG. 7, it will be understood that during any one run or period of operation of the apparatus, all of the articles handled and loaded are of the same diameter.

Stripper 150 further includes an extending arm portion 157 which extends in the left hand direction (viewing FIG. 1) and to the extreme left hand end of which there is adjustably attached one end of a chain support bracket 158 to the otherwise free end of which there is secured one end of a very flexible chain 159 which is preferably of a metal mesh or of a metal woven type to provide such chain with some weight for purposes hereinafter discussed. As stated above, bracket 158 is adjustably attached to said end of arm portion 157 of stripper 150 so that said one end of the chain can be raised or lowered if found expedient or desirable to do so. The second end of chain 159 is secured to stripper 150 adjacent to and to the left of the aforesaid exit ends of channels 154 and 155 in stripper 150. Upward or downward adjustment of said arm 158 therefore varies the height of the arcuate path of chain 159 between the above mentioned points of attachment of the ends of the chain. Chain 159, while not absolute essential to the operation of the apparatus of the invention, is provided for the purpose of eliminating or preventing, to the extent possible, skew between adjacent or contacting ones of the articles as they are being ejected from stripper 150 and as they are loading into the aforesaid boxes or cartons as hereinafter described. The above mentioned weight of the chain is further briefly mentioned hereinafter. There is also attached to sides 152 and 153, adjacent the lower edges thereof, a pair of deflector plates 160 and 161 respectively. (See FIGS. 1 and 7.) Such deflector plates open or spread the side closure flaps of boxes having such flaps along the side edges of the open tops of such boxes and when such type of boxes are being loaded, that is, filled or loaded by the apparatus of the invention. This will also be mentioned further hereinafter.

The upper surface or upper side of the triangularly cross-sectionally shaped lower strip 156 of stripper 150 (FIG. 7) embodies a relatively shallow channel 156a along the length of which is provided a metal tape guide strip or plate 162 of a relatively smooth material such as stainless steel, for example. Strip 162 is relatively thin and is supported within said channel 156a with a very thin or shallow spaced 156b remaining between the lower surface of strip 162 and the upper surface 156c of strip 156 which defines the lower limits of channel 156a. Such upper surface is made to be very smooth and a length of tape TP is illustrated in FIG. 7 as extending through said space 156b. Such length of tape emerges from stripper 150 at a location just to the right (viewing FIG. 1) of the aforesaid exit end of channels 154 and 155 in stripper 150 and is hereinafter further discussed. The tape TP is fed or supplied to said space 156b in strip 156 of stripper 150 at a channel entrance at the right hand end of such strip 156 as illustrated in FIG. 1, and the tape is supplied from a roll thereof by tape feed, supplying or dispensing apparatus to be discussed and which is shown in FIGS. 1a and 4 of the drawings. Such apparatus is an essential part of the apparatus of the invention. However, at this point it is pointed out that the tape TP is fed from said roll thereof by said tape feed or supplying apparatus and, as illustrated in FIGS. 1 and 2, extends about a rotatable and flanged tape guide roller 138 supported on suitable brackets such as 137 which are secured to the aforesaid support bracket 135. The downwardly extending part of such bracket comprises two spaced apart members and the tape extends from roller 138 in an upwardly sloping direction between the spaced apart members of bracket 135 and thence to said channel entrance at the right hand end of strip 156 of stripper 150. When FIGS. 1 and 1a of the drawings are disposed in relationship with each other as shown in FIG. 21, it will be noted that the tape TP of FIG. 1 joins with the same tape TP shown in FIG. 1a.

There is shown mounted on the top surface of the upper or cover strip 151 of stripper 150, and adjacent the right hand end of such stripper, a support bracket 164 (FIG. 1) for a light source LS, and a photosensitive device PC comprising a photocell or photodiode as are well known in the art. When the articles such as A have reflective surfaces, such as glass rods or tubes have for example, said light source LS and device PC are mounted as shown in FIG. 1 so that a light beam LB from the light source will impinge on each of said articles being conveyed by conveyor assembly 140 and be reflected into the light receiving lens or aperture of device PC to actuate such device to close or actuate an electrical circuit in the manner well known in the art and for purposes hereinafter discussed. If, however, the articles such as A do not have reflective surfaces, the light source and photosensitive device can be located on opposite upper and lower sides of chain 142 and of the conveyor blocks such as 143 of conveyor 140. In such case, a light beam is vertically beamed from the light source, and in a path beyond one edge of the conveyor blocks such as 143 and between the previously mentioned overhanging parts of the articles such as A, to impinge upon the light receiving lens or aperture of the photosensitive device when the light beam is not interrupted by the passing of one of said articles. With such an arrangement of a light source and a photosensitive device, each time an article interrupts the light beam an electrical circuit will be opened or actuated by the photosensitive device. However, in either of the described arrangements, an actuation takes place and an electrical impulse can be made to occur to indicate the passage or passing of one of said articles past the article detector comprising the light source and photosensitive device. In the first discussed arrangement illustrated in FIG. 1 for example, said electrical circuit is arranged to momentarily energize a suitable relay to momentarily close a pair of its normally open contacts to provide the electrical impulse. In the second described arrangement, said electrical circuit would be arranged to momentarily deenergize a normally energized relay to momentarily close a pair of its normally open contacts to provide the desired electrical impulse. In the operational example of the invention as hereinafter set forth, the first described article detection arrangement, as shown in FIG. 1 and as previously mentioned, is used for the purposes discussed above and is hereinafter again discussed, the relay which is employed in such first detection arrangement being relay PCR1 shown in FIG. 13b and discussed below. (Note also relay PCR2 in FIG. 15).

It is expedient to here point out that a first source of direct current electrical power of suitable voltage and capacity is provided for operation, control or actuation of most of the electrical components employed in the control system embodied in the invention. However, for purposes of simplification of the drawings, said source is not shown therein but its positive and negative terminals are designated B and N, respectively. Similarly, a second source of direct current electrical power of suitable voltage and capacity is provided for operation or actuation of one of the electrical components employed in said control system but, for the same reason as stated above, such source is also not shown in the drawings but its positive and negative terminals are designated B1 and N1, respectively. A commercial 110 volt power source of alternating current is also employed in the invention, such source being shown in FIG. 13a in a conventional manner and being designated PS. The opposite terminals of such power source are designated BX110 and NX110, respectively. Drawing FIG. 13a is discussed in more detail hereinafter.

Returning briefly to FIG. 1, there is shown, in the upper right hand corner of such drawing and in a conventional manner, a push button switch designated SW and having normally open electrical circuit controlling contacts which are actuated to closed conditions to close an electrical circuit when the push buttons of the switch is manually pushed or depressed. Such contacts remain closed after said manual operation and, to again open said circuit, the push button must be pulled. Such switches are well known but it is pointed out that other well known types of electrical switches, such as a knife switch for example, could be used in place of switch SW shown. Switch SW controls electrical circuits for previously mentioned light source LS and photosensitive device PC and, when the contacts of the switch are closed, a circuit for the energization of the light source is closed, such circuit extending from the above mentioned terminal B of the first power source and over said electrical contacts of switch SW and through the light source to terminal N of said power source. The closure of said switch contacts also closes an electrical circuit to and through photosensitive device PC and which thence extends over an electrical conductor PCC1 and may be traced, when the drawings are arranged as shown in FIG. 21 thereof, to FIG. 1a and then downwardly past FIGS. 13 and 13a to one side of the control winding of previously mentioned relay PCR1, shown in FIG. 13b, and through a rectangle representing the winding of such relay to terminal N of the power source. It will thus be apparent that relay PCR1 is the relay that is to supply or provide an electrical impulse for each article passing the article detection arrangement previously described. For purposes of expediency the windings of all the electrical relays employed in the apparatus of the invention are represented by rectangles similar to that shown for the above mentioned winding of PCR1. Such is a conventional expediency.

Referring now to FIGS. 1a and 4 of the drawings in detail, the apparatus for feeding or supplying the tape TP to the apparatus of FIGS. 1 and 2 is shown and includes a support frame 165 including long and short legs such as 166 and 167, respectively, and cross members or beams such as 168. Long and short vertical support plates 169 and 170, respectively, are shown secured to the right hand side of frame 165 when viewing FIG. 4, and a pair of lower pillow blocks 171 and 172 are attached to support plates 169 and 170, respectively, adjacent the lower ends of such plates. A vertical lever arm 173 is secured to a shaft 174 adjacent the center thereof and for rotation therewith, the ends of such shaft extending through pillow blocks 171 and 172 for rotation of the shaft therein in the usual manner.

The forked end of a clevis 175 is pivotally connected to lever arm 173 at about the center of the length of such arm and the second end of clevis 175 is secured to the otherwise free end of a piston rod TFCR of a pressurized fluid cylinder TFC, such rod extending out of a first end of such cylinder in the usual manner and the second end of the cylinder being pivotally attached to a suitable support bracket 176 which is secured to the upper surface of a support plate 177. First and second pressurized fluid conduits CD6 and CD7 are connected to said first and second ends of cylinder TFC, as is well known in the art, and said conduits are the same conduits shown in the upper right hand area of FIG. 14 and to be discussed in detail hereinafter. Fluid cylinder TFC and its associated piston rod TFCR are a motor means used for purposes discussed below but it should be pointed out that other types of motor means, such as an electric solenoid coil and its associated rod or plunger for example, could be used in place of the pressurized fluid motor means shown if found desirable or expedient to do so.

A second or upper pair of pillow blocks 181 and 182 are secured to support plates 169 and 170, respectively, but on the opposite faces of such plates from the pillow blocks 171 and 172. A drive shaft or axle 183 is rotatably supported in pillow blocks 181 and 182 and a suitable sprocket 184 is keyed to the left hand end of shaft 183 for driven rotation of the shaft as discussed below. There is also keyed to shaft 183, at approximately the center of such shaft and for rotation therewith, a tape drive wheel 185 which may be made of aluminum for example, and which, in conjunction with a second and smaller diameter tape tension wheel 186, drives, feeds or supplies the tape TP to the apparatus of FIGS. 1 and 2 as previously mentioned and as hereinafter further discussed. Tension wheel 186 is rotatively supported on lever arm 173 adjacent the upper end of such arm. The centerlines of the outer peripheries of wheels 185 and 186 substantially coincide with one another for movement or drive of the tape therebetween as described below.

An electric motor TFM is mounted on a suitable vertical support plate 187 which is secured adjacent and along its lower edge to a length of angle iron 188 which is supported on frame 165. Motor TFM has keyed to its output shaft, for rotation therewith, a relatively large diameter sprocket 190 and a link chain 191 loops about such sprocket and about previously mentioned sprocket 184 for rotational driving of the latter sprocket and of tape drive wheel 185.

It should be here set forth that motor TFM is a stepping motor which is driven by electric impulses supplied across the control winding of the motor, the output shaft of the motor being rotated a selected amount for each said electric impulse supplied thereto. such stepping motors are well known and motor TFM may, for example, be a 11.5 volt direct current Slo-Syn Motor, Type SS1800-1007 which is obtainable from The Superior Electric Company, Bristol, Conn. Such motor requires that 200 direct current electric impulses be supplied across the control winding of the motor for each complete revolution of the output shaft of the motor. It will be noted that motor TFM is shown in FIG. 1a as being connected to a first end of a first electrical conductor C whose second end is connected to terminal N1 of one of the previously discussed sources of electrical energy. A first end of a second electrical conductor MCC is also shown connected to motor TFM and such conductor extends to contact $d$ of a pair of electrical circuit controlling contacts $c$-$d$ of a relay CR2 (FIG. 15) contact $c$ of said pair of contacts being connected to the aforementioned terminal B1 of said one source of electrical energy. Said contacts $c$-$d$ of relay CR2 supply the above mentioned direct current electric impulses across the control winding of motor TFM as hereinafter discussed in more detail.

Returning to FIGS. 1a and 4, there is suitably rotatably supported by support plate 169, and adjacent the upper end of such support plate, a roll TPR of the previously mentioned tape TP, such roll being so supported on a short axle or shaft 192 which is secured to said support plate 169 in any suitable manner. The roll of tape TPR is preferably relatively free to rotate on shaft 192 and such shaft is arranged so that a new or succeeding roll of tape can be rapidly supplied thereto when a preceding roll is exhausted. The tape TP is shown extending from the outside or outer turn of tape roll TPR and thence downwardly and about the outer periphery of a freely rotatable idler wheel or roller 193 which is rotatably supported on a short shaft 194 affixed to support plate 169 just above frame 165. Tape TP then extends further downward and into and through a tape guide 195 which is affixed to the right hand side of frame 165 (front of such frame when viewing FIG. 4) and adjacent the top of such frame. The centerline of the outer periphery of roller 193 and the vertical centerline of tape guide 195 are of course, in alignment with the centerline of the tape TP and of the outer periphery of tape roll TPR. As best illustrated in FIG. 4a, tape guide 195 includes a main or support member 196, a pair of spacers or spacer members 197 and 198 which, in conjunction with a pair of front members 199 and 200, define the limits of a partially enclosed tape guide channel 201 for the tape TP.

From the lower end of the tape guide 195, tape TP extends downwardly and, when tape tension wheel 186 is in its position shown in FIG. 1a, between the outer periphery of that wheel and tape drive wheel 185. The tape then extends about part of the outer periphery of wheel 185 and to the left (viewing FIG. 1a) and thence to FIGS. 1 and 2 of the drawings as previously mentioned.

When piston rod TFCR of cylinder TFC is retracted within the cylinder, lever arm 173 is positioned as shown in FIG. 1a and tape TP is pressed by tension wheel 186 against the outer periphery of drive wheel 185 at the common tangent points of wheels 185 and 186. If, at such time, wheel 185 is rotated by the energization of motor TFM, that is, by the supplying of an electric impulse to motor TFM as previously discussed, tape TP is drawn between the outer peripheries of wheels 185 and 186 and the tape is moved a distance equal to the rotation of wheel 185, that is, equal to the movement of the outer periphery of wheel 185. Tape TP is thus dispensed, supplied, or fed to the apparatus of FIGS. 1 and 2. This is discussed hereinafter in substantially greater detail.

For purposes of simplification of the drawings, and brevity, to the extent possible, of the description of the control system covered by FIGS. 13 through 18 of the drawings, and without sacrifice of a ready understanding of the systems controlling the apparatus of the invention, the following expedients are employed to attain said brevity and simplification.

A plurality of electrically controlled or actuated relays are employed and the control winding or windings of each such relay is, as previously mentioned, represented by a rectangle (or a pair of rectangles) with the designation of the respective relay being disposed in or near the rectangle representing a respective relay winding. The electrical circuit controlling contacts of each such relay are shown below their respectively associated control winding (or windings) and a broken line extends between each respective relay control winding and its contacts therebelow. The members of each set of contacts of a respective relay are designated by different small case letters, and the fixed contact points or contacts of each relay, and with which each movable contact member makes contact, is termed a front contact (downwardly pointing contact against which the respective movable contact member is closed when the respective relay control winding is energized) or a back contact (an upwardly pointing contact against which the respective movable contact member is closed when the respective relay control winding is deenergized.) Two of the relays shown in FIG. 14 are so-called slow acting relays and, in such case, an arrow extends through each movable contact or contact member of such relays and points in the direction or directions in which each respective relay (the movable contact members of each relay) are slow acting. The slow acting relays are slow release relay R5 (SR) in which the movable contact members thereof are somewhat slow in opening or breaking contact with the fixed front contacts of the relays upon deenergization of the control windings of the relays and, therefore, are also slow in making contact with the fixed back contacts upon deenergization of the relay control winding, and a slow pickup relay R8 (SPU) whose movable contact member $a$ is somewhat slow in making contact with the fixed front contact $b$ of the relay upon energization of the control winding of the relay.

First and second manually operable push-button electrical circuit controlling switches SW1 and MS1 are shown in FIGS. 13a and 14, respectively, and are of the type whose electrical contacts are normally open but are actuated to and remain in an electrical circuit closing condition when the respective push button is manually pushed or pressed. After the pressing of such push-button switches and the closing of the contacts thereof, such contacts are reactuated to a circuit interrupting condition only when the push-button of the respective switch is manually pulled out of the pressed or closed condition thereof. Switches SW1 and MS1 are similar to switch SW shown in FIG. 1 and previously discussed.

A plurality of electric solenoid actuated pressurized fluid flow control valves TFCV, BRCV and BOCV are shown in FIG. 14 in the conventional manner, that is, by conventional symbols, and the previously discussed pressurized fluid motors of cylinders TFC, BRC and BOC shown in FIGS. 1, 2, 1a and 4 are shown schematically in FIG. 14 and are designated by respectively identical reference characters as in said drawings FIGS. 1, 2, 1a and 4. A suitable source of pressurized fluid, such as compressed air, is also provided for the actuation of the pressurized fluid actuated apparatus. However, said pressurized fluid source is omitted from the drawings for purposes of simplification thereof.

Figure 13:
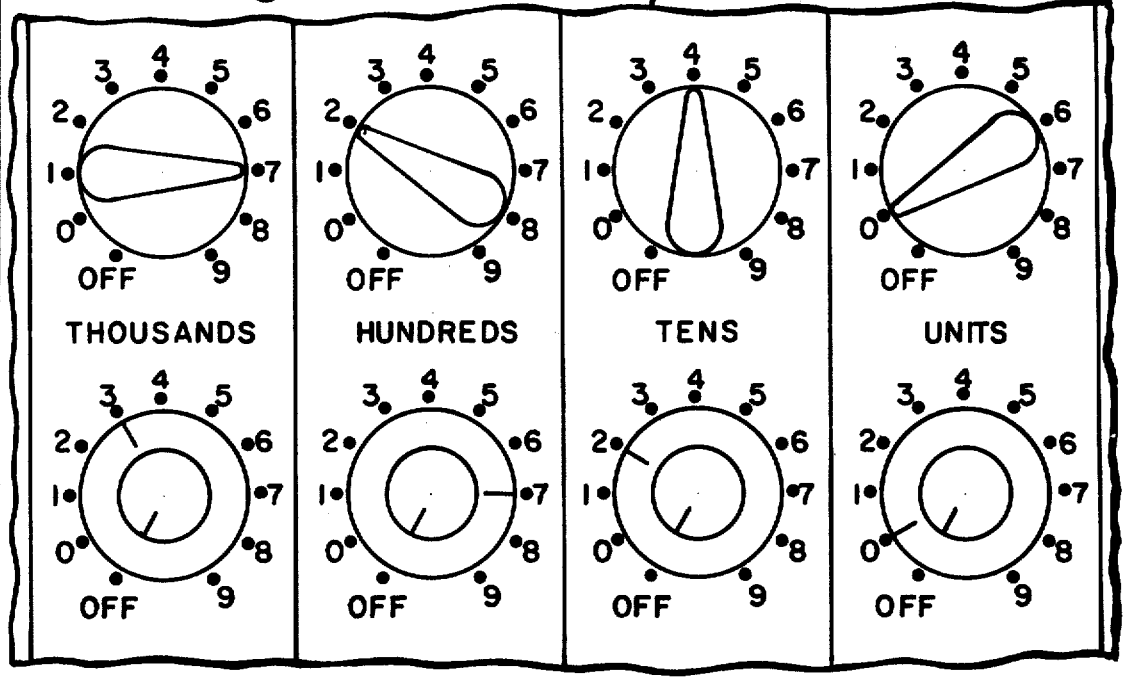
Figure 13A:
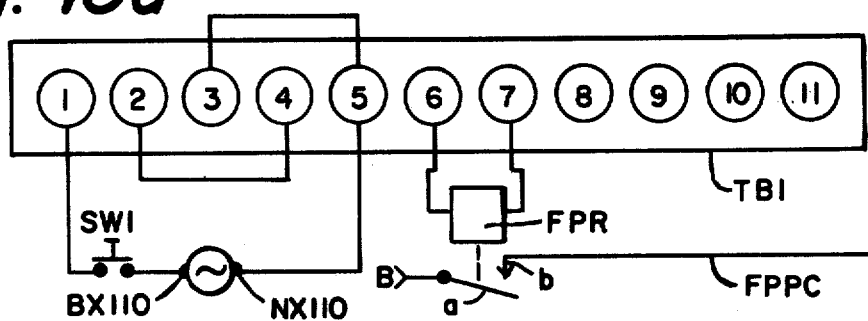
Figure 13B:
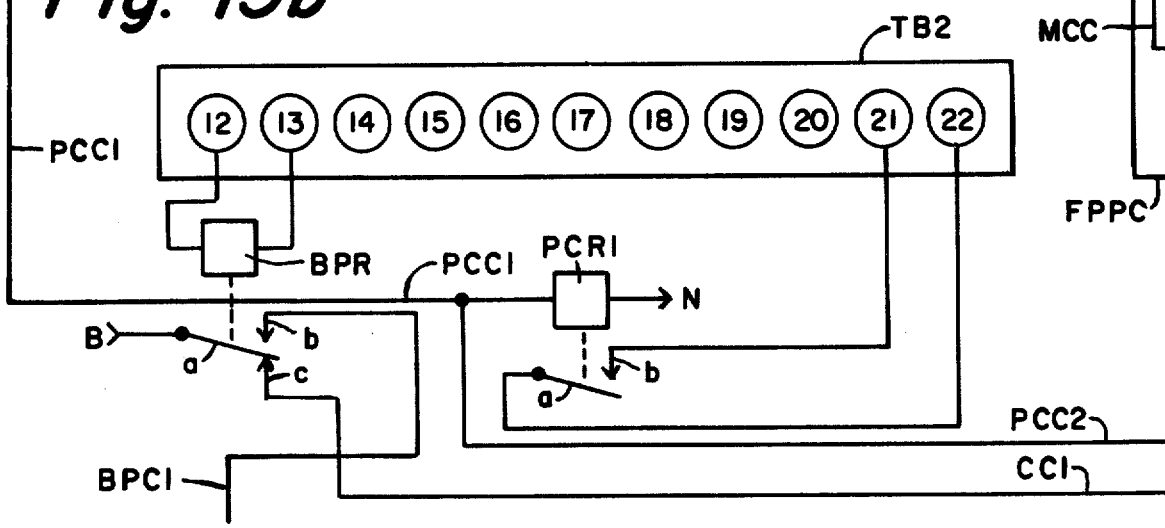

There is shown in FIGS. 13, 13a and 13b, a section of a control panel designated CP, and first and second terminal blocks TB1 and TB2, respectively. Such components are parts of an electronic counter such as is well known in the art, and the counter shown in said drawing figures may, for example, be a standard Model 7302A4T2 Electronic Counter which may be obtained from Automatic Timing & Controls, Inc., which is located in King of Prussia, Pa. The section of the control panel CP shown includes an upper or top group of four dials or rotary knobs which control rotary electric switches (not shown) in accordance with the position to which each switch is manually turned or actuated. Such dials are termed "batch preset" dials and, as indicated on panel CP, a batch preset count up to 9999 can be selected by manipulation of the dials. This will be discussed further hereinafter. Control panel CP is further shown as including a bottom or lower group of four pairs of concentric dials or rotary knobs and each of the pairs of the concentric dials or knobs control a tandem pair of rotary electric switches, that is, each dial or knob of a pair thereof when turned or rotated controls a different one of a pair of rotary switches arranged in tandem, as is well known. The outer or larger ones of the knobs or dials are used for selecting a so-called "first preset" while the smaller or inner knobs or dials are used for selecting a so-called "second preset". Similarly to the dials or knobs of the upper group, the outer dials or knobs of the lower group can select a first preset count up to 9999 and the inner dials or knobs can select a second preset count also up to 9999.

There is shown in FIG. 13a and in conjunction with terminal block TB1, electrical connections for supplying the previously discussed source of commercial alternating current energy to the electronic counter, such connections including a conductor or jumper connected between terminals 2 and 4, a conductor or jumper connected between terminals 3 and 5, a conductor connecting terminal 5 with terminal NX110 of said current source, and a conductor connecting terminal 1 with terminal BX110 of said current source when previously discussed switch SW1 is actuated, that is, is pushed or depressed and left in such actuated condition. There is also shown in FIG. 13a, a first preset relay FPR whose control winding is connected across terminals 6 and 7 of terminal block TB1 and which is energized to close its contacts a-b when the previously mentioned first present count, selected by the lower outer dials of control panel CP, is reached by the electronic counter. The electrical circuit controlled by said contacts a-b of relay FPR will be discussed hereinafter. For purposes of brevity, the previously mentioned second preset count is not employed in the operational examples set forth hereinafter and, therefore, no second preset relay is shown in the drawings. When such a relay is employed however, its control winding is connected across terminals 9 and 10 of terminal block TB1.

There is shown in FIG. 13b a batch preset relay BPR whose control winding is connected across terminals 12 and 13 of terminal block TB2 and which is energized to open its contacts a-c and close its contacts a-b when the previously mentioned batch preset count, selected by the upper dials of control panel CP, is reached by the electronic counter. The electrical circuits controlled by said contacts a-c and a-b of relay BPR will be discussed hereinafter. There is also shown in FIG. 13b, previously mentioned relay PCR1 whose normally open contacts a-b are connected across terminals 21 and 22 of terminal block TB2. As the article detecting arrangement, shown in the upper right area of FIG. 1 and including light source LS and photosensitive device PC, detects the passage of each article such as A relay PCR1 is momentarily energized over conductor PCC1 and contacts a-b of such relay momentarily close to pulse the electronic counter, that is, to enter into the counter a count of one for each said article. Another electrical conductor PCC2 is connected with conductor PCC1, such other conductor extending to the control winding of previously mentioned relay PCR2 (FIG. 15) having a pair of normally open contacts a-b. The operation of such relay is similar to relay PCR1 discussed above and said contacts a-b are used to supply electrical pulses or impulses to an additional counter, herein referred to as a "ratio" counter and further discussed hereinafter.

Referring to FIG. 16 of the drawings, there is shown a manually rotatable "first ratio units dial" FRUD which, as indicated by the broken line designated BL1, controls or actuates a rotary contact RCFU of a "first ratio units switch" FRUS. Dial or knob FRUD is similar to any one of the dials or knobs of the upper group of knobs or dials of previously discussed control panel CP of FIG. 13. Similarly, a manually rotatable "second ratio units dial" SRUD is shown in FIG. 16 and, as indicated by the broken line BL2, controls or actuates a rotary contact RCSU of a "second ratio units switch" SRUS. Dial SRUD and switch SRUS are similar to dial FRUD and switch FRUS, respectively.

Figure 17:
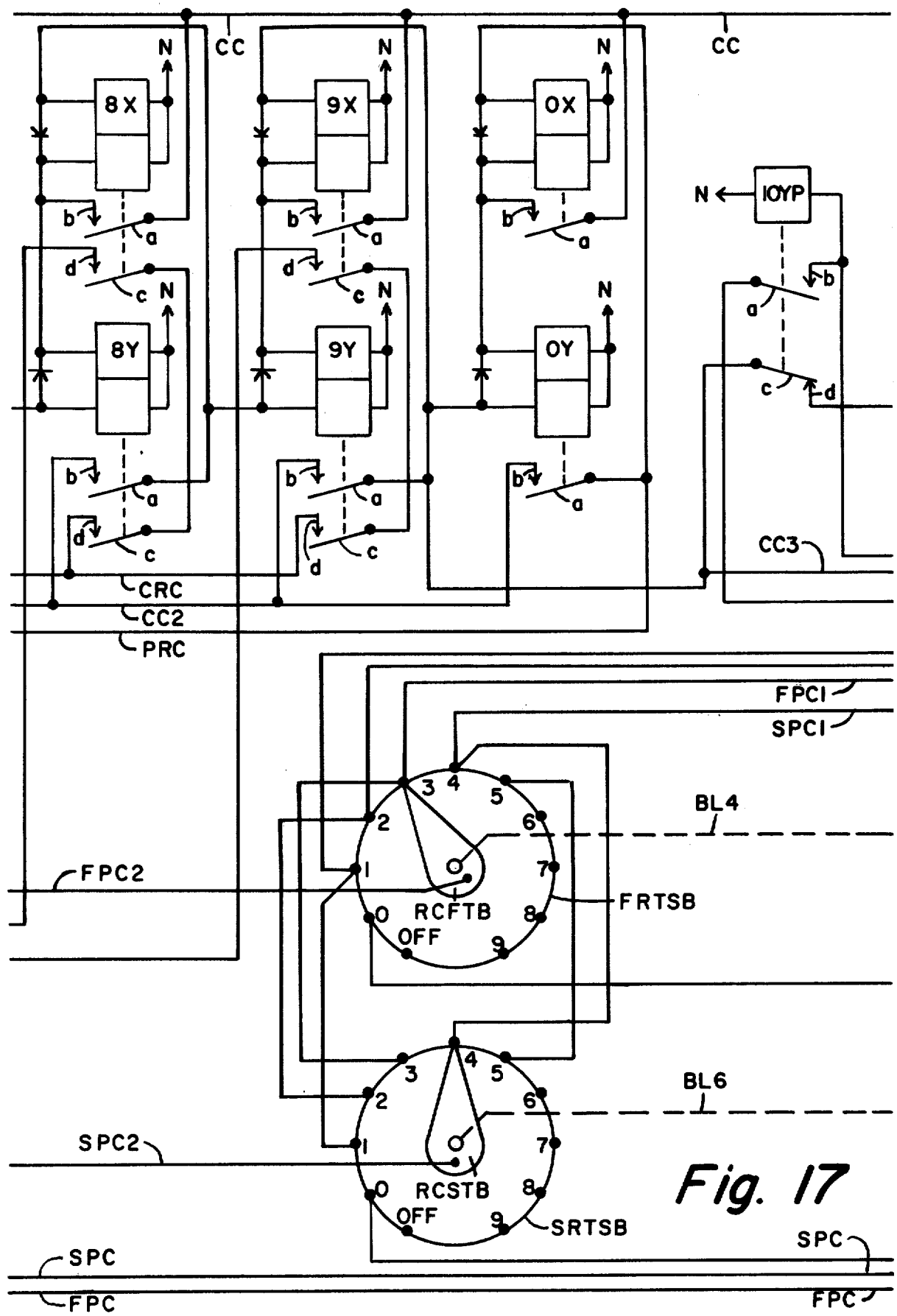
Figure 18:
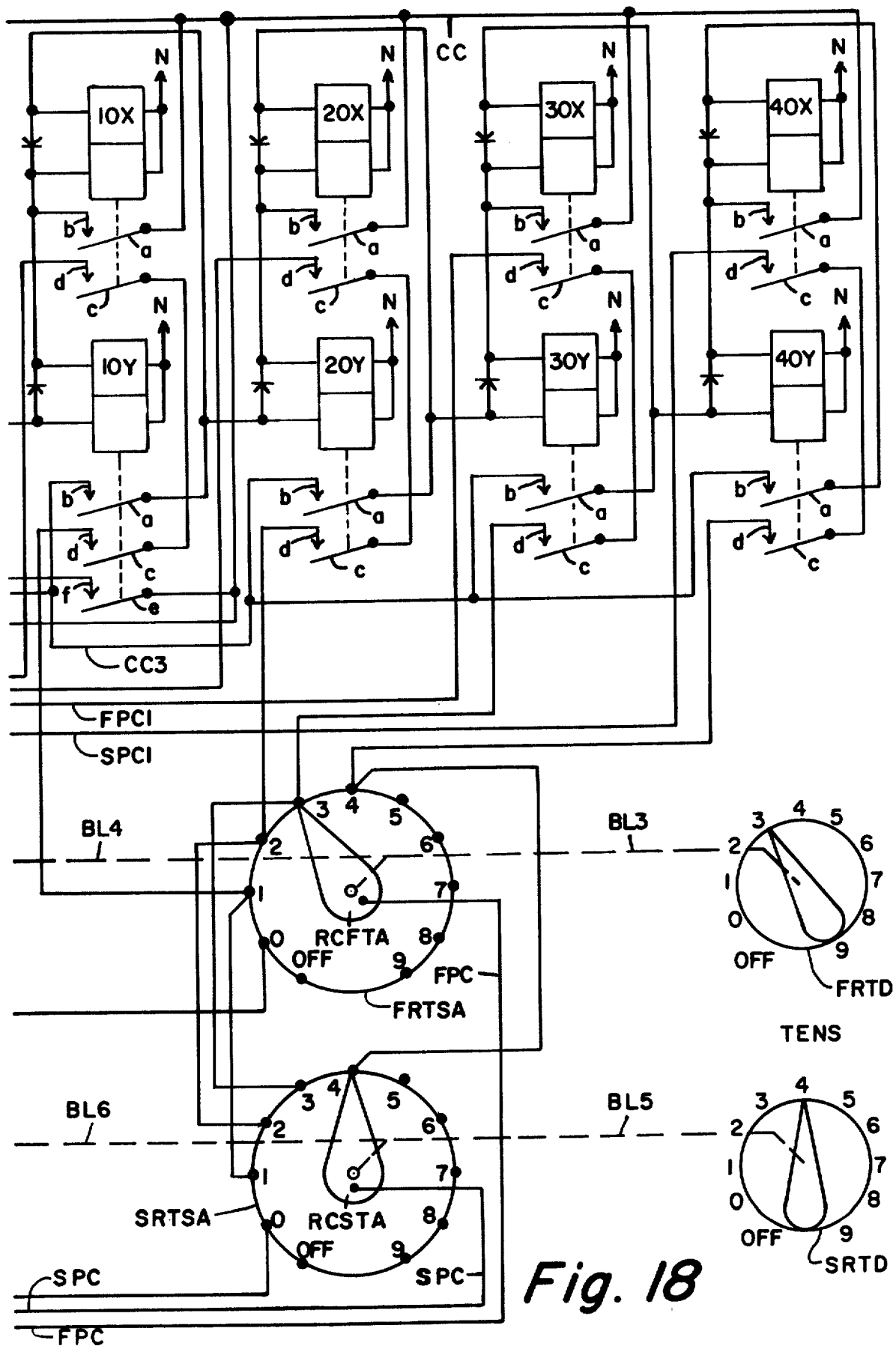

There is shown in FIG. 18 of the drawings a "first ratio tens dial" FRTD (FIG. 18) and, arranged in tandem, a first "first ratio tens switch" FRTSA and, in FIG. 17, a second first ratio tens switch FRTSB, the rotary contacts RCFTA and RCFTB of switches FRTSA and FRTSB, respectively, and as indicated by the broken lines BL3 and BL4, being actuated or rotated by manual rotation of dial or knob FRTD. Similarly, a "second ratio tens dial" SRTD (FIG. 18) as indicated by the broken lines BL5 and BL6, controls or actuates the rotary contacts RCSTA and RCSTB of a first "second ratio tens switch" SRTSA and a second second ratio tens switch SRTSB, respectively, such switches also being connected or arranged in tandem with each other. The purposes of the dials and switches just discussed will become apparent hereinafter in an operational example of the invention.

There is shown in FIGS. 15 through 18 a first plurality or series of relays designated 1X through 9X, 0X, 10X, 20X, 30X and 40X, and a second plurality or series of similar relays designated 1Y through 9Y, 0Y, 10Y, 20Y, 30Y and 40Y. Such relays are the counting relays of the previously mentioned ratio counter and will be discussed hereinafter in conjunction with the rotary switches above described. Each relay of said series of relays have double control windings or coils and each such relay is of a type which closes its front contacts when only one or the other of its control windings are energized. When both of the control windings of such a relay are energized, the magnetic flux of the windings cancels out and each respective relay does not close its said front contacts or, if such contacts are already closed, opens such contacts. Each said relay does not, of course, close its front contacts when both of the control windings of each respective relay are deenergized. Said relays are direct current relays and a asymmetric unit such as a diode is connected between the positive terminals of the each of the two windings of each respective relay, such diodes providing for selective energization of the windings of each pair of associated relays such as 1X and 1Y, 2X and 2Y, etc, as hereinafter discussed.

OPERATIONAL EXAMPLES OF THE INVENTION

An operational example of the control apparatus of FIG. 14 in transporting or moving boxes or cartons such as X into or through the path of movement of the boxes comprising the three paths of travel or transport of the boxes, as previously discussed in conjunction with the apparatus of FIGS. 1, 2 and 3, will first be given, and there will then be set forth examples of the operation of the previously described counting arrangements as they are employed in conjunction with said apparatus in the handling of the cylindrical articles such as rods or tubes loaded into said cartons or boxes.

With reference then to FIG. 14, it is initially pointed out that relay BPR1, at the top of such drawing FIG., is energized when the batch preset relay BPR (FIG. 13b) becomes energized and closes its contacts a-b. Such energization of relay BPR1 is over a circuit extending from terminal B of the previously discussed electrical power source (such as a suitable battery for example) over said contacts a-b of relay BPR (FIG. 13b) electrical conductor BPC1, and thence to FIG. 14 and through the winding of relay BPR1 to terminal N of said power source or battery. For purposes of the present discussion, it is merely pointed out that relay BPR (FIG. 13b) is energized to close its front contacts a-b when a preselected quantity or number of the aforesaid articles such as A have been loaded into a box or carton as previously mentioned and as hereinafter set forth.

At the initial startup of the apparatus, the previously mentioned source of pressurized fluid is activated or turned on and is supplied to a conduit CD1, and thence through solenoid valves TFCV, BRCV and BOCV to conduits CD7, CD5 and CD3, respectively, and thence to cylinders TFC, BRC and BOC, respectively. Such supply of pressurized fluid actuates piston rod TFCR (FIG. 1a) out of cylinder TFC, and retracts piston rods BRCR and BOCR (FIGS. 1 and 2) into their associated cylinders BRC and BOC, respectively, Conduits CD6, CD4 and CD2 associated with cylinders TFC, BRC and BOC, respectively, are connected to fluid sinks SK1, SK2 and SK3, respectively, at such time.

The above mentioned actuation of piston rod TFCR moves tension wheel 186 (FIG. 1a) to the right and a length of tape TP is then pulled from tape roll TPR and is threaded through its path shown in FIGS. 1a and 1 of the drawings, such path including roller 193, tape guide 195, tape drive wheel 185, idler wheel 138, to the right hand end of channel 156b (FIG. 7) of stripper 150 and through such channel to the left hand end thereof (viewing FIG. 1). A first empty box or carton such as X is manually placed at the article loading station in the previously discussed second path of travel or transport of cartons or boxes, and the end of tape TP is pulled from said channel 156b of stripper 150 and the tape is pulled over the open top or top end of the box placed at the loading station. For holding of the end of the tape, such end is then inserted between the leading end of said box (left hand end viewing FIGS. 1 and 2) and the box pusher such as 93 immediately in advance of the box. The end of the tape is preferably also secured to said end of the box as by a suitable adhesive, contact cement or adhesive tape. It is here pointed out that tape TP is narrower than the open tops or top ends of the boxes or cartons so that the tape can be lowered or pushed into the boxes as articles such as A are supplied or loaded onto the upper surface of the tape as discussed below.

Following the preparations described above, switch MS1 in FIG. 14 is manually pushed or depressed to close contacts a-b of such switch and supply electrical power to the control apparatus of FIG. 14. The following concurrent or sequential operations take place at such time.

The solenoid winding of valve TFCV is energized over contacts c-d of a relay R1 and pressurized fluid is then supplied over conduit CD6 to cylinder TFC, and piston rod TFCR is thereby retracted to actuate tension wheel 186 (FIG. 1a) to the left and into contact with tape TP, such tape then being pressed into contact with tape drive wheel 185 for movement or feeding of the tape as hereinafter further discussed.

Previously mentioned relay R5 is energized over contacts a-c of limit switch LS1 and contacts a-b of limit switch LS2. The energization of relay R5 closes at contacts a-b of such relay an energizing or charging circuit for a capacitor-resistor unit CRU2 for a purpose hereinafter pointed out, and prepares, at contacts d-e of such relay, an energization circuit for the winding W1 of empty box conveyor motor EBCM.

Following the delay time for the closing of contacts a-b of previously mentioned slow pickup relay R8, such contacts close and complete the circuit for the energization of winding W1 of motor EBCM. Relay R8 thereafter maintains its contacts a-b closed until switch MS1 is manually pulled to open its contacts a-b at the end of a run or period of operation of the apparatus of the invention.

The above mentioned energization of winding W1 of motor EBCM drives the box pushers or transporters such as 50 and 60 in the first or entrance path of travel or transport of the boxes (FIG. 2) and boxes are manually supplied to the entrance end of such path for transport to the second path of travel or transport therefor.

The leading box such as X in said first path of travel is moved onto lift plate 70 (FIGS. 1 and 2) and contacts the actuating arm of limit switch LS1 to actuate contacts *a-c* of such switch to open to deenergize relay R5 and contacts *a-b* of the switch to close to prepare an energization circuit for a relay R7.

Following the time delay provided by the slow release feature of relay R5, contacts *a-b* of such relay open and contacts *a-c* thereof close to connect the winding of a relay R6 to capacitor-resistor unit CRU2. This momentarily energizes relay R6 but the actuation of the contacts of the relay performs no function at this time. The release of relay R5 opens, at contacts *d-e* of the relay, the energization circuit for winding W1 of motor EBCM and the aforesaid box pushers or transporters 50 and 60 stop. The release of relay R5 also closes, at contacts *d-f* of the relay, an energization circuit for the solenoid winding of valve BRCV and such valve is actuated to supply pressurized fluid to the lower end of cylinder BRC. Piston rod BRCR (FIG. 1) is, thereby, extended to raise lift plate 70 and box such as X thereon. Such box is thus moved into the initial station or entrance end of the second or box loading path of travel.

The upward actuation of lift plate 70 opens contacts *a-b* of limit switch LS2 and closes contacts *a-b* of limit switch LS3 to further prepare the energizing circuit for relay R7.

Conveyor 140 (FIG. 1) is activated to convey the articles such as A to the aforesaid box manually positioned at the article loading station, such activation being performed just subsequent to the above-mentioned closing of switch MS1 or at a later time. In any case, switch SW (FIG. 1) is pushed or depressed to close the energization circuit for light source LS (FIG. 1) and thereby activate the article detection arrangement previously discussed. As the articles such as A are conveyed by conveyor 140 to stripper 150, each such article is counted by the previously discussed electronic counter and, when the aforesaid preselected quantity or number of articles such as A are so counted, relay BPR (FIG. 13) is momentarily energized to, in turn, energize relay BPR1 of FIG. 14. The energization of relay BPR1 closes at contacts *a-b* of such relay an energization circuit for relay R1, and concurrent or sequential actuations or operations of the control system of FIG. 14 and the apparatus of the invention occur as described below.

The articles such as A being delivered to stripper 150 (FIGS. 1 and 7) are moved through channels 154 and 155 of the stripper as previously mentioned, and out of the exit end of the stripper and onto the upper surface of the length of tape TP as also previously mentioned. At such time and as discussed in detail hereinafter, small lengths of tape are intermittently dispensed by the apparatus shown in FIGS. 1a and 4, and the weight of the articles such as A delivered to said upper surface of tape TP, aided by the additional weight of chain 159 (FIG. 1) causes said small lengths of dispensed tape to be pulled to the loading station and lowered into the box at such station, thereby also lowering and loading said articles into the box. Such operation continues until the aforesaid preselected quantity or number of articles have been counted by the electronic counter.

When relay R1 is energized as discussed above, it closes a holding circuit for itself including its own contacts *a-b* and contacts *a-c* of a relay R2. Relay R1 is thus maintained energized after contacts *a-b* of relay BPR1 open. The energization of relay R1 also opens, at contacts *c-d* of such relay, the energization circuit for the solenoid winding of valve TFCV and such valve is reactuated to its condition shown in FIG. 14 so that pressurized fluid is again supplied to conduit CD7 to actuate piston rod TFCR to its extended position and tension wheel 186 (FIG. 1a) out of contact with tape TP. Such tape is, therefore, again free to be moved or pulled.

Said energization of relay R1 also completes, at contacts *e-f* of such relay, the energization circuit for relay R7 which then closes its contacts *c-d* to close an energization circuit for winding W2 of full box conveyor motor FBCM, such circuit extending through an adjustable resistor or potentiometer POT which may be manually adjusted for controlling the speed of motor FBCM. The energization of motor FBCM drives chains 75 and 76 (FIGS. 1 and 2) to move the rearward box pushers such as 93 attached to such chains in the direction (to the left when viewing FIGS. 1 and 2) to move the aforesaid box manually positioned at the loading station (first box) and the second previously mentioned box previously moved or lifted into the initial station in the second path of travel or transport of the boxes (second box) towards the exit end of such path.

When the box pusher (93) ahead of said manually positioned or first box has moved past limit switch LS4, the actuating arm of such switch is no longer actuated and contacts *a-c* of such switch (FIG. 14) open and contacts *a-b* of the switch close to close an energizing or charging circuit for a capacitor resistor unit CRU1 for the purpose mentioned below. When said second box is moved sufficiently that the actuating arm of limit switch LS1 is no longer actuated, contacts *a-b* of such switch open to open the previously mentioned energizing circuit for relay R7. Such relay is maintained energized, however, over a holding circuit, including its own contacts *a-b*, and winding W2 of motor FBCM is continued to be energized over contacts *c-d* of relay R7. Movement of the first and second boxes continues, and the second box is moved completely off of lift plate 70 (FIGS. 1 and 2) and completely into the loading station while the first box is moved into the previously mentioned first intermediate station by one of the box pushers such as 93. The tape TP is pulled or drawn over the open top or top end of the second box while such box is being moved into the loading station, it being remembered that tape TP is, as mentioned above, free to be pulled or moved. The second box is thus provided with a length of tape extending across the open top thereof. As the first box approaches the end of said first intemediate station, the actuating arm of limit switch LS4 is contacted and actuated by the box pusher such as 93 which is moving such first box. Such actuation causes contacts *a-b* of switch LS4 (FIG. 14) to close and discharge the capacitor of unit CRU1 through the winding of relay R2 to momentarily energize such relay, and the following operations then occur.

The holding circuit for relay R1 is momentarily opened at contacts *a-c* of relay R2 and relay R1 is deenergized to again close, at its contacts *c-d*, the energizing circuit for the solenoid winding of valve TFCV and, thereby, cause piston rod TFCR of cylinder TFC to be retracted to again press tape TP between tape tension wheel 186 and tape drive wheel 185 (FIG. 1a) for intermittent feeding or dispensing of the tape as previously mentioned and as hereinafter further discussed. The momentary energization of relay R2 also momentarily closes, at contacts *a-b* of such relay, an energizing circuit for a relay R3 which closes its contacts *a-b* to close a holding circuit for itself. Relay R3 is, therefore, now maintained energized. The above mentioned deenergization of relay R1 opens, at its contacts *e-f*, the holding circuit for relay R7 and such relay releases and opens at its contacts *c-d* the energizing circuit for winding W2 of motor FBCM. Movement of the box pushers such as 93 (FIGS. 1 and 2) is, therefore, terminated upon the above mentioned actuation of limit switch LS4. The above mentioned momentary energization of relay R2 also momentarily closes at contacts *d-e* of such relay, an energizing circuit for a relay R4 which then closes a holding circuit for itself including its contacts *a-b*.

The above discussed energization of relay R3 opens, at contacts *c-d* of such relay the energizing circuit for the solenoid winding of valve BRCV to thereby again supply pressurized fluid to conduit CD5 to cause retraction of piston rod BRCR of cylinder BRC and again lower lift plate 70 (FIGS. 1 and 2). The above described energization of relay R4 closes, at contacts *c-d* of such relay, an energizing circuit for the solenoid winding of valve BOCV to actuate such valve to cause pressurized fluid to be supplied to conduit CD2 and, thereby, extend piston rod BOCR of cylinder BOC to move box push plate 130 (FIGS. 1 and 2) to push a box, at the exit end of the second path of travel or transport of the boxes, out of such path and into the entrance end of the third path of travel. However, at this time, there is no box at said exit end and, therefore, only the actuation of said piston rod and the push plate 130 occurs.

The above mentioned actuation of piston rod BOCR causes contacts *a-b* of limit switch LS5 to momentarily open and further interrupt the energizing circuit for relay R7. Such contacts of switch LS5 prevent relay R7 from being energized and, thereby, energizing motor FBCM when piston rod BOCR and push plate 130 are in their box push-out positions. Said actuation of piston rod BOCR also causes contacts *a-b* of limit switch LS6 to momentarily open and interrupt the holding circuit for relay R4, thereby deenergizing such relay which then opens its contacts *c-d* to again deenergize the solenoid winding of valve BOCV and, thereby, cause retraction of piston rod BOCR and push plate 130.

The above mentioned lowering of lift plate 70 causes closure of contacts *a-b* of limit switch LS2 and opening of contacts *a-b* of limit switch LS3. Such opening of contacts *a-b* of limit switch LS3 further interrupts the energizing circuit for relay R7 such contacts being provided in such circuit to prevent the energization of motor FBCM when lift plate 70 is in its lowered position. Contacts *a-b* of limit switch LS1 in the energizing circuit for relay R7 assures that a box or carton is correctly positioned on lift plate 70 before motor FBCM can be energized to move the box pushers such as 93 (FIGS. 1 and 2).

The above mentioned closing of contacts *a-b* of limit switch LS2 again closes the energizing circuit for relay R5 and such relay again closes its contacts *a-b* to again energize or charge capacitor-resistor unit CRU2. The energization of relay R5 again closes, at contacts *d-e* of such relay, the energizing circuit for winding W1 of empty box conveyor motor EBCM and the box pushers such as 50 and 60 in the first path of travel or transport of the boxes again move to push the boxes in such path towards lift plate 70, and the leading box in such path is pushed onto said lift plate and contacts the actuating arm of limit switch LS1 to open contacts *a-c* of such switch. This again deenergizes relay R5 and contacts *d-e* of such relay subsequently open to deenergize motor EBCM while contacts *a-c* of such relay close to discharge the capacitor of capacitor-resistor unit CRU2 through the winding of relay R6 and momentarily energize such relay. Such energization of relay R6 opens the holding circuit for relay R3 which releases and closes its contacts *c-d*. This completes the energizing circuit for solenoid winding of valve BRCV, such circuit being prepared by the deenergization of relay R5 and the subsequent closing of contacts *d-f* of such relay. The energization of the solenoid winding of valve BRCV again causes actuation of piston rod BRCR to its extended position to raise lift plate 70 and the box then on such lift plate, as previously discussed in conjunction with the previously mentioned second box which is being loaded at the loading station at this time. Each time relay BPR1 is thereafter energized as hereinafter further discussed, the above described concurrent and sequential operations occur and a run or period of such operations is continued until the desired or necessary number of boxes are loaded with the articles such as A.

As each box is moved by one of the box pushers such as 93 through the second path of travel, the respective pusher of each box moves or slides upwardly along the contacted end of the respective box being pushed. This is due to the slope of the looped paths of travel of chains 75 and 76, and of the pushers such as 93, as previously pointed out. Therefore, as the previously discussed second box, is moved from the loading station towards the previously mentioned first intermediate station, the pusher such as 93 of the previously mentioned first box moves upward and the sloping knife or knifelike edge 93*f* (FIG. 8) of the pusher moves into contact with the length of tape TP extending between the first and second boxes to cut such tape with a slicing or upward guillotine type of movement of the sloping knife or knifelike edge 93*f*. It is believed apparent that a similar operation occurs between each successive pair of boxes moved from the loading station by the pushers such as 93.

It is also pointed out that the previously discussed first and second boxes are pushed out of the exit or box push-out end of the second path of travel and into the entrance end of the third path of travel when third and fourth boxes, respectively, are moved to the end of the previously mentioned first intermediate station, that is, to the end of the first station beyond the loading station. Such push-out of said boxes is, of course, performed by the actuation of piston rod BOCR of cylinder BOC to its extended position and corresponding actuation of push plate 130 (FIGS. 1 and 2) as discussed in the foregoing operational example. All of the boxes moved through the second path of travel or transport of the boxes are similarly moved from such path and into the third path of travel, as is believed readily apparent.

The operation of the apparatus can be interrupted at any time and started again at a later period since the previously discussed electronic counter will retain its count unless it is manually reset. During such an interruption the article conveyor 140 (FIG. 1) is, of course, stopped.

It should be pointed out that the previously discussed first box manually positioned at the loading station may not receive close to a full count of said preselected quantity or number of articles such as A because channels 154 and 155 (FIG. 7) of stripper 150 (FIG. 1) do not contain any articles when article conveyor 140 and the article detecting arrangements including light source LS and photosensitive device PC (FIG. 1) are first activated. Thus, the last of some of the articles which are counted as being delivered to said first box are not actually so delivered but remain in stripper 150 when the first box is moved from the loading station. For this reason, the first loaded box of any run or period of operations of the apparatus of the invention is not sold or stored.

At the end of each complete run or period of operations of the apparatus such as, for example, when the apparatus is to be used for loading another size or diameter of articles, manual switch MS1 (FIG. 14) is pulled to return the apparatus shown in FIG. 14 to its initial condition previously discussed. At the start of such a new run or period of operations of the apparatus, the previously described initial startup procedures are again followed.

The boxes conveyed and loaded by the apparatus of the invention are shown in FIGS. 1, 2 and 3 merely as oblong rectangles designated X and, therefore, may be assumed to be the type of boxes BB shown in FIG. 20 but without a top lid or cover such as BB$a$. If boxes such as BA (FIG. 19) having top closure flaps are conveyed and loaded by the apparatus, when lift plate 70 (FIGS. 1 and 2) raises each such box into the initial station in the second path of travel or transport of the boxes, the side closure flaps of each respective box are moved into contact with the previously mentioned deflectors such as 160 and 161 (FIGS. 1 and 7) attached to the sides of stripper 150 and such contacted flaps are pushed and somewhat bent aside by the deflectors to assure that such flaps do not interfere with the entrance of tape TP or the loading of articles such as A into the open top or top end of boxes such as BA, as will be readily apparent to those skilled in the art.

Referring again to FIGS. 13$b$, and FIGS. 15 through 18 arranged as shown in FIG. 21, the movable contact member $a$ of previously mentioned contacts $a$-$b$ of previously mentioned relay PCR2 (FIG. 15) is connected, over contacts $a$-$b$ of a relay CR1 to be discussed, to a conductor CC1 and over contacts $a$-$c$ of previously discussed batch preset relay BPR (FIG. 13$b$) to positive terminal B of the previously mentioned battery or power source. Fixed contact member $b$ of said contacts $a$-$b$ of relay PCR2 (FIG. 15) connects over conductor CC2 to the control circuits for the previously discussed counting relays of the previously mentioned ratio counter. Specifically conductor CC2 connects to contact $d$ of a pair of contacts $c$-$d$ of a relay 1YP, to be discussed, and through such contacts to the control windings of counting relay 1Y and the diode connected across such windings. Conductor CC2 also connects to multiple circuits hereinafter discussed. As previously mentioned, an electrical pulse or impluse is supplied over contacts $a$-$b$ of relay PCR2 each time an article is detected by the photosensitive device PC of FIG. 1, relay PCR2 being actuated to only momentarily close its said contacts $a$-$b$ at such times.

In general, the previously discussed counting relays, along with above mentioned relay 1YP, are actuated in the following described sequence in response to a series or sequence of electrical impulses or pulses supplied over contacts $a$-$b$ of relay PCR2.

First pulse on. - Supplied over closed contacts $c$-$d$ of relay 1YP (FIG. 15) across both windings of relay 1Y (relay 1Y remains released) and the lower winding only of relay 1X (relay picks up to close its contacts $a$-$b$ and $c$-$d$). Closure of contacts $a$-$b$ of relay 1X closes a holding circuit for relay 1X, such circuit extending from previously mentioned conductor CC1 over contacts $a$-$b$ of previously mentioned relay CR1, contacts $a$-$b$ of a relay CR2, to be discussed, and to a conductor CC and thence to said contacts $a$-$b$ of relay 1X.

First pulse off. - Power from the above mentioned holding circuit for relay 1X flows through upper winding only of relay 1Y and such relay picks up to close its contacts $a$-$b$, $c$-$d$ and $e$-$f$. Closure of contacts $a$-$b$ of relay 1Y closes a circuit to conductor CC2 but such conductor is deenergized at such time. Closure of said contacts $c$-$d$ of relay 1Y, along with the prior closure of contacts $c$-$d$ of relay 1X temporarily prepares a first energizing circuit for above mentioned relay CR2, such circuit extending from fixed contact member $d$ of relay 1X to a conductor FPC3 and thence to fixed contact 1 of rotary switch FRUS (FIG. 16) and to the rotary contact RCFU of such switch when such rotary contact is in its position shown in FIG. 16. This will be discussed further hereinafter. Closure of said contacts $e$-$f$ of relay 1Y closes an energizing circuit for relay 1YP such circuit extending from said conductor CC and over said contacts $e$-$f$ to the winding of relay 1YP. Relay 1YP picks up to close its contacts $a$-$b$ and complete an obvious holding circuit for itself. The energization of relay 1YP also opens at contacts $c$-$d$ of the relay the previously discussed circuit to the windings of relay 1Y but such circuit was previously deenergized by the termination of the first electrical impulse. Relay 1YP remains energized over its holding circuit until such circuit is opened as hereinafter discussed. The continued energization of relay 1YP acts as a temporary lock-out to temporarily prevent subsequent pulses from being supplied, across both windings of relay 1Y and the lower winding of relay 1X, over the circuits discussed above for the pickup of relay 1X.

Second pulse on. - Pulse is supplied from conductor CC2 over contacts $a$-$b$ of relay 1Y across both windings of relay 1X which then releases to open its aforesaid holding circuit. Relay 1Y remains up for duration of such pulse. Pulse is also supplied across both of the control windings of relay 2Y (relay remains released) and to the lower winding only of relay 2X which then picks up to close its contacts $c$-$d$ and its holding circuit over its own contacts $a$-$b$, such circuit extending to conductor CC and thence as traced for the holding circuit for relay 1X.

Second pulse off. - Relay 1Y releases and opens its contacts $a$-$b$, $c$-$d$ and $e$-$f$. Power from above mentioned holding circuit for relay 2X flows through upper winding only of relay 2Y and such relay picks up to close its contacts $a$-$b$ and $c$-$d$. Closure of said contacts $a$-$b$ closes a circuit to conductor CC2 but such conductor is deenergized at such time. Closure of said contacts $c$-$d$ of relay 2Y, along with the prior closure of contacts $c$-$d$ of relay 2X, temporarily prepares a second energizing circuit for above mentioned relay CR2, its first temporarily prepared energizing circuit having been opened when relay 1X released. Such second temporarily prepared circuit extends from fixed contact member $d$ of relay 2X to a conductor which connects to fixed terminal 2 of rotary switch FRUS (FIG. 16).

Third pulse on. - Pulse is supplied from conductor CC2 over contacts *a-b* of relay 2Y across both windings of relay 2X which then releases to open its aforesaid holding circuit. Relay 2Y remains up for the duration of such third pulse. Pulse is also supplied across both of the control windings of relay 3Y (relay remains released) and to the lower winding only of relay 3X which then picks up to close its contacts *c-d* and its holding circuit over its own contacts *a-b*, and extending to conductor CC and thence as traced for the holding circuit for relay 1X.

Third pulse off. - Relay 2Y releases and opens its contacts *a-b* and *c-d*. Power from above mentioned holding circuit for relay 3X flows through upper winding only of relay 3Y and such relay picks up to close its contacts *a-b* and *c-d*. Closure of said contacts *a-b* closes a circuit to conductor CC2 but the conductor is deenergized at such time. Closure of said contacts *c-d* of relay 3Y, along with the prior closure of contacts *c-d* of relay 3X, temporarily prepares a third energizing circuit for above mentioned relay CR2, its second temporarily prepared energizing circuit having been opened when relay 2X released. Such third temporarily prepared circuit extends from fixed contact member *d* of relay 3X to a conductor which connects to fixed terminal 3 of rotary switch FRUS (FIG. 16).

It is pointed out that said third electrical pulse or impulse is prevented from being supplied across both windings of relay 2Y and the lower winding of relay 2X by the open contacts *a-b* of relay 1Y.

To simplify the further discussion of the operation of some of the other counting relays of the ratio counter, only the sequence of operation of such relays will be set forth, since the circuits therefor and thereof will be readily apparent to those skilled in the art from the above description of the operation of relays 1X, 1Y, 2X, 2Y, 3X and 3Y. For purposes of further simplification, the energized or picked up and the deenergized or released conditions of said other counting relays will merely be designated "up" and "down" respectively.

Fourth pulse on. - Relay 3X down and relay 4X up.
Fourth pulse off. - Relay 3Y down and relay 4Y up.
Fifth pulse on. - Relay 4X down and relay 5X up.
Fifth pulse off. - Relay 4Y down and relay 5Y up.

Similar operation occurs for each of the subsequent pulses 6 through 9. However, on the tenth pulse relay OX (FIG. 17) and relay 10X (FIG. 18) are both energized, the energizing circuit for relay 10X including normally closed contacts *c-d* of a relay 10YP which corresponds to previously discussed relay 1YP as will become apparent. On the termination of the tenth pulse, relays 0Y and 10Y become picked up similarly to the Y relays previously discussed. The picking up of relay 0Y closes and prepares at contacts *a-b* of such relay, a circuit to a conductor PRC which extends to an asymmetric unit such as a diode D1 (FIG. 15) and through such unit or diode to both of the windings of relay 1Y and the lower winding of relay 1X. Such circuit is provided to assure that relay 1X will become energized on the next (eleventh) pulse supplied to conductor CC2, such pulse flowing over conductor CC2 to said contacts *a-b* of relay 0Y in FIG. 17 and thence to conductor PRC and through diode D1 to said windings of relays 1X and 1Y. A failure to count 11th, 21st, 31st, etc. pulses is thereby prevented since the necessity for deenergizing and reenergizing relay 1YP (FIG. 15) is avoided at such times.

Returning to FIGS. 17 and 18, when relay 10Y is picked up on the termination of the 10th pulse, relay 10YP is energized over contacts *e-f* of relay 10Y, relay 10YP then closing its holding circuit including its own contacts *a-b*, and opening its contacts *c-d* to open the circuits to both of the windings of relay 10Y and the lower winding of relay 10X. The previously mentioned eleventh pulse supplied to conductor CC2 releases relay OX and, upon the termination of such eleventh pulse, relay 0Y releases. The eleventh pulse is not supplied to relays 10X and 10Y because of the prior opening of contacts *c-d* of relay 10YP. Relays 10X and 10Y are, therefore, maintained, energized over the holding circuit of relay 10X and the first "tens" count is stored.

Returning to FIG. 15, on the termination of said eleventh pulse, relay 1Y is energized to prepare the pickup circuit for relay 2X to receive the 12th electrical impulse. Such 12th, and the 13th through 19th pulses are counted by the 2X through the 9X and 2Y through the 9Y relays the same as the second through the ninth pulses were counted by such relays. Now, on the on-off of the 20th pulse, relays 0X and 0Y (FIG. 17) are energized as with the on-off of the tenth pulse and conductor CC3 (FIGS. 17 and 18) is also energized to conduct the 20th pulse over contacts *a-b* of relay 10Y to both of the windings of relay 20Y and only the lower winding of relay 20X as is now believed apparent. The similar circuit to the similar windings of relays 10Y and 10X having been previously opened at contacts *c-d* of relay 10YP, the 20th pulse is not similarly supplied to the windings of such relays. However, the twentieth pulse is supplied over contacts *a-b* of relay 10Y to the upper windings of relays 10X and 10Y. Relay 10X is then released and relay 10Y held energized for the duration of the twentieth pulse, such relay releasing after the termination thereof. The reenergization of relay 0Y on the termination of the 20th pulse causes the 21st pulse to be supplied to conductor PRC and thence to the windings of relays 1X and 1Y in the same manner as the 11th pulse. The 21st pulse also deenergizes relay 0X and upon the termination of the 21st pulse relay 0Y releases. Relay 20Y became picked up upon the termination of the 20th pulse and a count of 20 is stored in the tens relay group. The 30th and 40th pulses energize the 30X and 30Y, and 40X and 40Y relays, respectively, in a manner similar to that described above for the 20X and 20Y relays.

Prior to giving a detailed operational example of the operation of the ratio counter in conjunction with the other apparatus of the invention, it is believed expedient to point out the reasons for the use of such a counter.

If a tape such as TP (FIGS. 1, 1*a*, 2, 4 and 4*a*) were not used for the loading of a preselected quantity of the articles, such as A, into each of the boxes used, but each such box were loaded merely by dumping or supplying the articles directly into each respective box, said articles could be merely counted and, when said preselected quantity of articles was counted, the loaded box would be moved out of the loading station and an empty box moved into such station. However, the use of the tape TP requires that a preselected length of tape be supplied or dispensed for each box moved to the loading station and such preselected length of tape should be the same for each box of a series or sequence of boxes of a particular size being used or loaded. For purposes of an example only, the boxes or cartons such as X shown in FIGS. 19 and 20 are assumed to require, in addition to the length of tape drawn or pulled across the open top of each box as it is moved into the loading station, that an additional preselected length of 40 inches of tape be periodically supplied or dispensed to each respective box by the apparatus of FIGS. 1a and 4 and during the loading of each box. This holds true regardless of the diameter of the articles being loaded into each box during a run or period of operation of the apparatus of the invention even though the number or quantity of articles, loaded into each box during each said run or period, varies because the diameters of the articles may vary from run to run, as previously mentioned. The following specific examples will aid in clarifying these statements.

It is further assumed that in loading cylindrical articles such as rods or tubes having an outside diameter of 0.350 inch, 1740 of such articles are loaded into a box such as BA or BB shown in FIGS. 19 and 20. If the articles loaded have an outside diameter of 0.425 inch, 1140 of such articles are loaded into a box. If the articles have an outside diameter of 0.190 inch, 7240 of such articles are loaded into a box. Therefore, if the apparatus of the invention is used for loading such different sizes of articles during each of different runs of the apparatus and 40 inches of tape is incrementally supplied or dispensed for each box loaded, equal short lengths of the 40 inches of tape must be dispensed for different parts or fractions of the different quantities of different diameter articles. Therefore, for the aforesaid 0.350 inch diameter articles, one inch of the tape should be dispensed for each quantity of 43.5 (1740/40) of such articles loaded; for the 0.425 inch diameter articles, 1 inch of the tape should be dispensed for each quantity of 28.5 (1140/40) of such articles loaded; and for the 0.190 inch diameter articles, one inch of tape should be dispensed for each quantity of 181 (7240/40) of such articles loaded. It is, of course, impossible to count halves (0.50) of articles since it is impossible to generate an electrical pulse representing half of an article of a series of articles being counted.

It is also necessary for the proper article loading operations of the apparatus of the invention, especially in loading frangible articles, that the tape such as TP be dispensed in increments of the 40 inch lengths of tape smaller than 1 inch increments and a length of 0.20 inch has been selected for each said increment. Accordingly, 0.20 inch of tape should be dispensed for each quantity of 8.7 (43.5/5 or 1740/200) articles of 0.350 inch diameter loaded, 0.20 inch of tape for each quantity of 5.7 (28.5/5 or 1140/200) articles of 0.425 inch diameter loaded, and 0.20 inch of tape for each quantity of 36.2 (181/5 or 7240/200) articles of 0.190 inch loaded. As previously stated fractions, such as 0.50, 0.70 and 0.20 of an article cannot be counted and, therefore, the ratio counter embodied in the present invention was developed, for use with the standard counter previously discussed, for the purpose of dispensing substantially equal short lengths of each 40-inch length of tape at substantially the same rate regardless of the diameter and, therefore, the quantity of articles being loaded during a run of the apparatus, the same rate meaning, in the examples set forth, 0.20 inch of tape for each said quantity (X) of articles divided by 200 (X/200) as pointed out above.

Referring again to the examples set forth above, if a first quantity of eight of the articles having a 0.350 inch outside diameter are counted 105 times for a total count of 840 articles and a second quantity of nine of such articles are counted 100 times for a total count of 900 articles, then a grand total count of exactly 1740 articles results ($8 \times 105 + 9 \times 100 = 1740$). Similarly, if a first quantity of five of the articles having a 0.425 inch outside diameter are counted 60 times for a total count of 300 articles and a second quantity of six of such articles are counted 140 times for a total count of 840 articles, then a grand total count of exactly 1140 acticles results ($5 \times 60 + 6 \times 140 = 1140$). Again, if a first quantity of 31 of the articles having a 0.190 outside diameter are counted 120 times for a total of 3720 articles and a second quantity of 44 of such articles are counted 80 times for a total count of 3520 articles, then a grand total count of exactly 7240 articles results ($31 \times 120 + 44 \times 80 = 7240$). As an additional example, if a first quantity of five of articles having a 0.440 outside diameter are counted 124 times for a total counnt of 620 articles and a second quantity of six of such articles are counted 80 times for a total count of 480 articles, then a grand total count of exactly 1100 articles results ($5 \times 124 + 6 \times 80 = 1100$) such grand total of articles being the quantity of articles of a 0.440 outside diameter that would be loaded into one of the aforesaid boxes such as AB or BB.

It will be remembered that 200 electrical pulses or impulses are supplied to stepping motor TFM of the tape dispensing or feeding apparatus of (FIGS. 1a and 4) to actuate or rotate the output shaft of such stepping motor precisely one revolution. Since it requires 200 short lengths of tape TP, each of which lengths are 0.20 inch in length, to dispense the total 40 inches of tape to be fed or supplied by the apparatus of FIGS. 1a and 4 for each box loaded by the apparatus of the invention, one full revolution of the output shaft of motor TFM is required to dispense the specified or selected 40 inches of tape TP. Accordingly, sprocket 190, chain 191, sprocket 184, and the diameter (circumference) of tape drive wheel 185 (FIGS. 1a and 4) are selected so that such drive wheel will move 40 inches of tape for each full revolution of the output shaft of motor TFM.

Returning to the standard and ratio counters and the four examples of the counts made thereby, in the first of the four examples set forth, 840 is the first preset count for the standard counter and 1740 is the second preset (batch) count for such counter. In such first example, 8 would be the setting for the first ratio count and 9 the setting for the second ratio count. Accordingly, the four upper dials of panel CP shown in FIG. 13 (standard counter) would be set, in the order from left to right, on 1, 7, 4 and 0, respectively (batch preset) and the four outer lower dials of panel CP, in the order from left to right, on 0, 8, 4 and 0, respectively (first preset). As previously mentioned, the inner lower dials are not used in the examples given and, therefore, they all would be set on "off". In such first example, the dial (FIG. 16) for the first ratio units count (upper dial FRUD) would be set on 8 and the dial for the second ratio units count (lower dial SRUD in FIG. 16) would be set on 9. The first and second ratio tens dials FRTD and SRTD (upper and lower dials respectively, in FIG. 18) would both be set on 0.

In order to shorten to the extent possible, the description of the manipulation of the dials of the standard counter and those of the ratio counter in selecting the proper settings for each diameter (quantity) of articles to be loaded, only the above separate example is given. However, a single example of the settings of the dials will be set forth in the following operational example and it is believed that such example, along with said separate example given above, will suffice to provide a complete understanding of how preset and ratio selections are made by manipulation or setting of the dials of the standard and ratio counters.

The upper dials of the standard counter are shown in FIG. 13 as set, in the order from left to right, on 7, 2, 4 and 0, respectively. The outer lower dials of the ratio counter are shown as set, in the order from left to right, on 3, 7, 2 and 0, respectively. The first and second ratio units dials FRUD and SRUD in FIG. 16 are set on 1 and 4, respectively, and the first and second ratio tens dials FRTD and SRTD in FIG. 18 are set on 3 and 4, respectively. Thus, the first ratio of the ratio counter is 31 and the second ratio of such counter is 44. It will be noted that such settings of the dials of the counters, in the first operational example of the invention now to be given, are for articles having a 0.190 inch outside diameter, and 7240 of such articles are to be loaded into each box moved to the loading station of FIGS. 1 and 2. It will be assumed that an empty box has been moved to the loading station as previously described and a count of the articles being delivered to the box has begun, an electrical impulse or pulse being supplied over conductor PCC1 (FIGS. 1, 1a, 13 and 13a) to relay PCR1 in FIG. 13b and over conductor PCC2 (FIG. 13b) to relay PCR2 in FIG. 15 for each article counted. Relay PCR1 supplies over its contacts a-b corresponding electrical counting impulses across terminals 21 and 22 of terminal block TB2 of the standard counter while relay PCR2 similarly supplies, over its contacts a-b, corresponding electrical counting impulses to conductor CC2 (FIG. 15) as previously discussed. Such pulses actuate the counting components of the standard counter and, in the manner previously described, the pulses also actuate the counting relays of the ratio counter.

When the ratio counter reaches the count of 31, a circuit to relay CR2 (FIG. 15) is completed, such circuit being traced from battery terminal B over contacts d-f of relay FPPR, conductor FPC (FIGS. 15, 16, 17 and 18) rotary contact RCFTA of switch FRTSA (FIG. 18) fixed contact 3 of such switch, contacts c-d of relay 30Y, contacts c-d of relay 30X, conductor FPC1 (FIGS. 18 and 17) fixed terminal 3 of switch FRTSB (FIG. 17) rotary contact RCFTB of such switch, conductor FPC2 (FIGS. 17 and 16) rotary contact RCFU of switch FRUS (FIG. 16) fixed contact 1 of such switch, conductor FPC3 (FIGS. 16 and 15) contacts c-d of relay 1X (FIG. 15) conntacts c-d of relay 1Y, conductor CRC and thence through the winding of relay CR2 to terminal N of the battery. Relay CR2 is thus energized and picks up to open its contacts a-b and momentarily interrupt the previously discussed circuit to conductor CC for supplying electrical current to the holding circuits of the "X" relays of the counting relays of the ratio counter to thereby deenergize all of the counting relays and, thereby, in turn, interrupt the just traced energizing circuit for relay CR2. The above described momentary energization of relay CR2 also closes at contacts c-d of such relay the pulsing circuit for motor TFM of the tape dispensing apparatus, such circuit extending from terminal B1 of the aforementioned current source over contacts c-d of relay CR2, conductor MCC, (FIGS. 15, 13b, 13a, 13 and 1a) to said motor TFM, and through the actuating winding of motor TFM (FIG. 1a) to a conductor C and thence to terminal N1 of the aforementioned current source. An electrical pulse or impulse is thereby supplied to such motor and the motor is thus stepped to drive tape drive wheel 185 to dispense 0.20 inch of tape TP in response to a count of 31 articles by the ratio counter. It will be noted that the momentary deenergization of conductor CC, as discussed above, interrupts the holding circuit over contacts a-b of relay 1YP to the winding of such relay and the relay then releases in preparation for another count of 31 pulses by the ratio counter. Relay CR2 is extremely fast in actuating its contacts upon the energization of its control winding so that it opens its contacts a-b to release relays 1YP, 1X and 1Y before the count of 32 (31 + 1) articles energizes relay PCR2 to close its contacts a-b to insert such count of 32 into the counting relays of the ratio counter.

Figure 15:
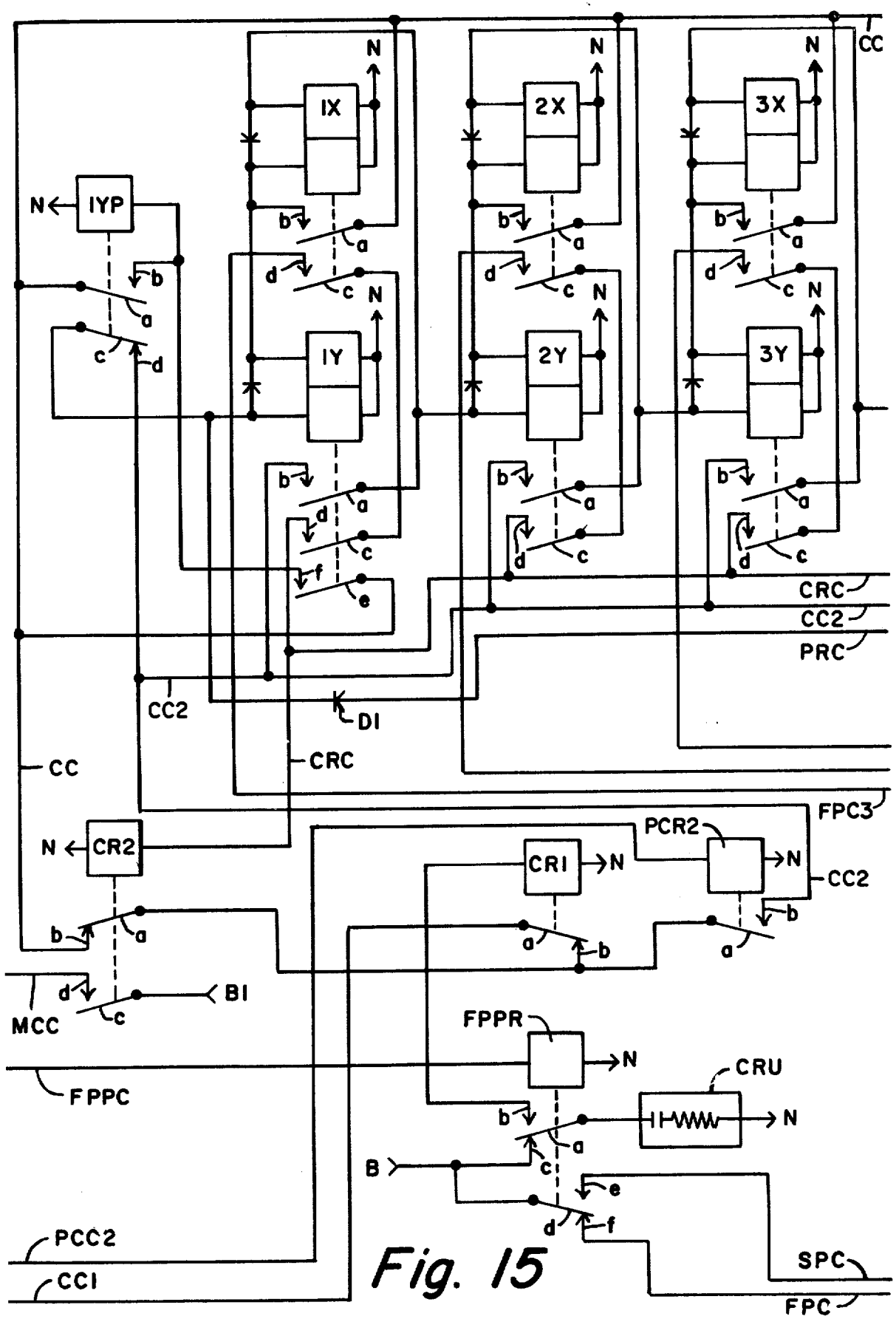

The above described operations (count of 31) occur for 120 times, each count of 31 articles supplying a stepping pulse to motor TFM for a total of 120 pulses to such motor and a total count of 3720 articles. At the end of the count of 3720 articles (the first preset for the standard counter) relay FPR (FIG. 13a) is energized over contacts 6 and 7 of terminal board TB1 of the standard counter and contacts a-b of such relay close to close a circuit to relay FPPR (FIG. 15). Such circuit extends from terminal B of the battery over said contacts a-b of relay FPR, conductor FPPC and to and through the winding of relay FPPR to terminal N of the battery. Relay FPR (FIG. 13a) after the above discussed energization thereof, remains energized until the second preset or batch count (7240) is reached by the standard counter, that is, until relay BPR (FIG. 13b) is energized and released as hereinafter discussed. Relay FPR, at that time, releases along with relay BPR. Relay FPPR remains energized over contacts a-b of relay FPR as long as the latter relay remains energized, and relay FPPR releases when relay FPR releases, as also hereinafter discussed. While relay FPPR is in its deenergized condition, it has closed, over its contacts a-c, a charging or energizing circuit for a capacitor-resistor unit CRU and, when such relay is energized, the capacitor of such unit discharges over contacts a-b of the relay to momentarily energize previously mentioned relay CR1 which opens its previously mentioned contacts a-b to momentarily interrupt the supply of current to contacts a of relays CR2 and PCR2. This assures that the counting relays of the ratio counter are all released before the second or batch preset count has begun to be stored. At this time a count of an article may be lost but the loss of the count of a single article in one batch count of 1000 or more articles is considered immaterial and tolerable.

When relay FPPR is energized as mentioned above, contacts d-f of such relay open to open the previously traced circuit to conductor FPC and contacts d-e of the relay close to prepare a circuit to conductor SPC traced below. The release of relay CR1, following the discharge of the capacitor of unit CRU, again closes, at contacts a-b of the relay, the energizing circuit for conductor CC and including contacts a-b of relay CR2.

The second preset for the standard counter in the example under discussion is the batch preset count of 7240 articles as previously mentioned, and the second preset for the ratio counter is 44 as also previously pointed out. Thus, the second ratio counter preset of 44 must be counted 80 times to add a total count of 3520 articles to the previous total count of 3720 articles of the first preset count of the standard counter and provide a resultant grand total count of 7240 articles, as also previously discussed. Relay PCR2 (FIG. 15) is being periodically and momentarily energized as before and in response to electrical impulses supplied thereto from the article detection apparatus including the photosensitive device PC (FIG. 1). Relay PCR2 thus supplies, over its contacts a-b, electrical pulses or impulses to the counting relays of the ratio counter in the same manner as that previously set forth in detail.

When counting relays 40X and 40Y are energized and relays 4X and 4Y are then subsequently energized, a circuit to relay CR2 (FIG. 15) is again completed, such circuit being traced from terminnal B of the battery over contacts d-e of relay FPPR, conductor SPC (FIGS. 15, 16, 17 and 18) rotary contact RCSTA of switch SRTSA (FIG. 18) fixed contact 4 of such switch, fixed contact 4 of switch FRTSA, contacts c-d of relay 40Y, contacts c-d of relay 40X, conductor SPC1 (FIGS. 18 and 17) fixed contact 4 of switch FRTSB (FIG. 17) fixed contact 4 of switch SRTSB, rotary contact RCSTB of such switch, conductor SPC2 (FIGS. 17 and 16) rotary contact RCSU of switch SRUS (FIG. 16) fixed contact 4 of such switch, fixed contact 4 of switch FRUS, conductor SPC3, contacts c-d of relay 4X, contacts c-d of relay 4Y, conductor CRC (FIGS. 16 and 15) and thence to the winding of relay CR2 (FIG. 15) and through such winding to terminal N of the battery. Relay CR2 is thereby energized to open the holding circuits for the X relays of the counting relays of the ratio counter and to supply another stepping pulse over conductor MCC to motor TFM in FIGS. 1a and 4. Relay CR2 subsequently releases to prepare the counting relays for another count of 44 articles, such operations repeating 80 times as previously mentioned.

In the meantime the standard counter has been counting the actuations of relay PCR1 (FIG. 13b) and, when the 44th count of the 80 repeat of such counts is reached, the batch preset count of 7240 articles is also reached by the standard counter, and relay BPR in FIG. 13b becomes momentarily energized to open its contacts a-c and close its contacts a-b. The opening of said contacts a-c of relay BPR interrupts the supply of current to conductor CC1 (FIGS. 13b and 15) and further operation of the ratio counter is temporarily interrupted. (The opening of contacts a-b of relay CR2 has, of course, also momentarily interrupted the operation of the ratio counter). Relay FPR (FIG. 13a) of the standard counter is released when relay BPR releases, and relay FPPR (FIG. 15) releases to open its contacts d-e to interrupt the circuit to the second preset conductor SPC and again close its contacts d-f to again close the circuit to the first preset conductor FPC (FIG. 15). The above mentioned momentary closing of contacts a-b of relay BPR closes a circuit to conductor BPC1 (FIGS. 13b and 14) and relay BPR1 in FIG. 14 is momentarily energized to initiate another operation of the apparatus of FIGS. 1 and 2 of the drawings, and the movement of the filled or loaded box then at the loading station, out of such station and the next succeeding empty box in the paths of travel of the boxes into the loading station. It will be noted that articles such as A are continuously moved or transported to the loading station and are continuously being counted. However, with the exception of the previously mentioned first box, the additional boxes such as X intermittently and successively moved to the loading station each receive a substantially equal count of articles since the articles counted and not delivered to each preceding box at the loading station, that is, the count of articles remaining in stripper 150 (FIG. 1) when a preceding box is moved from the loading station, are delivered to the next succeeding box moved to such station and such is repeated for each preceding and succeeding box. Potentiometer PQT shown in FIG. 14 can be manually actuated to regulate or adjust the speed of full box conveyor motor FBCM in accordance with the speed of the article conveyor 140 (FIG. 1) and, thereby, regulate the apparatus to load a substantially equal number of articles in each box being loaded during any one run or period of operation of the apparatus.

It is expedient to point out that, in selecting the ratios and the corresponding settings of the dials of the ratio counter for the first and second presets, it is expedient that the setting for the first preset be the lower or smaller preset and the second preset be the higher or larger preset. This is advantageous in that the tape such as TP is then dispensed at a higher rate (0.20 inch of tape for a lesser count of articles) at the begining of the loading of a box than towards the end of such loading. In the examples previously set forth, it will be noted that the dial settings for a total count of 1740 articles were selected as 8 for the first preset and 9 for the second preset, the dial settings for both the total counts of 1140 and 1100 articles were selected as 5 for the first presets and 6 for the second presets, while the dial settings for the total count of 7240 articles were selected as 31 for the first preset and 44 for the second preset. Such settings provide for the dispensing of a greater amount of tape during the first preset operations when articles are still towards the tops of boxes being loaded. This prevents or reduces chances of pile-ups of articles on the tape and above the tops of the boxes before the articles are begun to be lowered into their respective boxes by the tape.

It is also pointed out the values of the presets of the ratio counter, that is, the first and second preset counts of such counter should be as close together as possible in order to make the rates of dispensing of the tape as equal as possible during the first and second presets of each loading operation. This is the reason for selecting the counts of 8and 9, 5 and 6, and 31 and 44 for the preset counts in the examples given.

The apparatus embodying the invention is shown and described herein as being arranged or disposed in a U-shaped planar configuration or layout so as to provide a U-shaped path of movement for the boxes or cartons such as X (FIG. 2). However the apparatus could, as well, and with very little modification, be arranged in an in-line planar layout to provide a straight line path of movement for the boxes or cartons or, as a further alternative, either the first or the third paths of travel in the path of movement of the boxes could be aligned with the second path of travel to provide an L-shaped layout for the apparatus. Furthermore, the apparatus of either or both of the first and third paths of travel could be eliminated with, of course, corresponding elimination of the advantages of such eliminated path or paths. In this connection, it is pointed out that the first path of travel or transport in the path of movement of the boxes is, in effect, a storage magazine from which empty boxes or cartons are periodically and automatically supplied to the initial or preloading station in second path of travel in said path of movement, thereby eliminating the necessity for a workman to be almost constantly present at the initial or preloading station at the entrance end of said second path for the purpose of periodically supplying or delivering an empty box or carton to the apparatus at said initial station at said entrance end. Similarly, the third path of travel or transport in the path of movement of the boxes or cartons is, in effect, a temporary storage facility for filled boxes or cartons and the provision of such third path eliminates the necessity for another workman to be almost constantly present at the exit end of the second path of travel in said path of movement of the filled boxes or cartons for the purpose of removing from such path each filled or full box as it is moved to said exit end. While both the first and third paths of travel in the path of box movement could be eliminated and only the apparatus of the second path of travel provided (along with the possibility of only a single workman being able to handle both the empty and full or filled boxes) the provision of the apparatus of the first and third paths of box travel or transport makes it possible that workmen or a workman tend the apparatus of the invention only periodically, thereby freeing such workmen or workman to perform other duties between the periods of tending to the apparatus of the invention by supplying empty boxes to and removing full or filled boxes from such apparatus.

Although there is herein shown and described in detail only one form of apparatus embodying the invention, it will be understood that such is not to be considered in any way limiting but that various changes and modifications may be made in the invention within the purview of the appended claims without departing from the spirit and scope thereof.

What is claimed is:

1. In combination with an apparatus for conveying a succession of similar elongate cylindrical articles to an article delivery location, an apparatus for receiving, transporting and loading a plurality of such succession of articles in each of a series of similar containers such as open top boxes each having an interior width greater than the length of said articles, such apparatus comprising:
   I. means for stepwise and sequentially moving said series of containers lengthwise through a path of travel including in collinear succession a preloading station, a loading station, an intermediate station, and a container exit station;
   II. means adjacent said article delivery location for detecting each said article passing such location;
   III. first and second counting means for counting said articles, such means actuated by said article detecting means;
   IV. a tape supply source, such tape having a width less than said interior width of said containers;
   V. tape dispensing means controlled by said first counting means and for dispensing collinearly with said collinear succession of stations a first preselected length of said tape from said supply source each time such first counting means counts a predetermined number of articles of each of said plurality of articles, the summed total length of the preselected lengths of tape dispensed for each respective container being the same predetermined total length regardless of the diameter of said articles and of the total count of the articles in said plurality thereof loaded into each said container;
   VI. article transport means collinear with said collinear succession of stations and having an article receiving end disposed adjacent said article delivery location for receiving said articles from said apparatus for conveying a succession of articles to such delivery location, said transport means also having an article delivery end located above said loading station and extending over a part of a second length of said tape extending over the open top of a container dwelling at such station, such delivery end for depositing said articles on and across said second length of tape with the length of such articles paralleling said interior width of said container;
   VII. means controlled by said second counting means for temporarily disabling said tape dispensing means when a container is loaded with said plurality of said succession of articles;
   VIII. means controlled by said second counting means for actuating said container moving means to simultaneously move each container at each of said collinear succession of stations to the next succeeding station, such movement of a loaded container from the loading station to the next succeeding station drawing one of said second lengths of said tape from said tape supply source and across the length of the open top of a succeeding container which is simultaneously moved from the preloading station to the loading station, and then reenabling said tape dispensing means; and
   IX. means for severing a length of said tape which extends between each adjacent pair of containers, such means operating as the containers are moved from said loading station to said exit station.

2. Apparatus as in claim 1 and further including a path of travel for a series of empty containers, and means in such path for transporting all containers in such path towards and the first of such containers to said preloading station following the movement of a preceding container out of such station.

3. Apparatus as in claim 1 and further including a path of travel for filled containers, such path having an entrance end adjacent said container exit station, and means at such exit station for pushing each filled container arriving at such exit station out of such station and into said entrance end of said path of travel for filled containers.

4. Apparatus as in claim 3 and further including a path of travel for a series of empty containers, and means in such path for transporting all containers in such path towards and the first of such containers to said preloading station following the movement of a preceding container out of such station.

5. Apparatus in accordance with claim 1 and in which said articles are tubes of a frangible material such as glass.

6. Apparatus in accordance with claim 2 and in which said articles are tubes of a frangible material such as glass.

7. Apparatus in accordance with claim 3 and in which said articles are tubes of a frangible material such as glass.

8. Apparatus in accordance with claim 4 and in which said articles are tubes of a frangible material such as glass.

9. Apparatus for loading a preselected plurality of similar elongate cylindrical articles in each of a series of similar containers such as open top boxes having an interior width greater than the length of said articles, such apparatus comprising, in combination:
  I. means for transporting said series of boxes lengthwise, stepwise and sequentially through a succession of collinear stations including a preloading station, a loading station, an intermediate station and a box exit station;
  II. a tape supply source for supplying tape in alignment with said stations, such tape having a width less than said interior width of said boxes,
  III. article transport means collinear with said stations and for receiving said articles and sequentially transporting such articles to said loading station and depositing such articles on and across a length of said tape drawn over the open top of a box as it is transported to the loading station;
  IV. means for counting said articles as they are supplied to and received by said article transport means;
  V. tape dispensing means for periodically dispensing short lengths of said tape from said tape supply source to a box at said loading station, such tape dispensing means controlled by said counting means in accordance with preselected quantities of said plurality articles counted by such counting means, and such short lengths of tape lowering said articles into a box as the articles are deposited on and across said length of tape extending across a box at the loading station;
  VI. means controlled by said counting means for actuating said article transport means each time such counting means counts said preselected plurality of articles and simultaneously disabling said tape dispensing means so that a box being transported from said loading station draws a length of said tape from said supply source thereof and across the length of the open top of a box being transported into such loading station, and reenabling the dispensing means following the completion of the box movements; and
  VII. means for severing the tape extending between each adjacent pair of boxes as each respective such pair are transported toward said box exit station.

10. Apparatus as in claim 9 and further including a path of travel for a series of empty boxes, and means in such path for transporting all boxes in such path towards and the first one of such boxes to said preloading station following the transport of a preceding box out of such station.

11. Apparatus as in claim 9 and further including a path of travel for filled boxes, such path having an entrance end adjacent said box exit station, and means at such exit station for pushing each filled box arriving at such exit station out of such station and into said entrance end of said path of travel for filled boxes.

12. Apparatus as in claim 11 and further including a path of travel for a series of empty boxes and means in such path for transporting all boxes in such path towards and the first of such boxes to said preloading station following the transport of a preceding box out of such station.

13. Apparatus in accordance with claim 9 and in which said articles are tubes of a frangible material such as glass.

14. Apparatus in accordance with claim 10 and in which said articles are tubes of a frangible material such as glass.

15. Apparatus in accordance with claim 11 and in which said articles are tubes of a frangible material such as glass.

16. Apparatus in accordance with claim 12 and in which said articles are tubes of a frangible material such as glass.

* * * * *